(12) United States Patent
Mizukami et al.

(10) Patent No.: US 6,241,614 B1
(45) Date of Patent: Jun. 5, 2001

(54) CLUTCH DISK ASSEMBLY HAVING A TWO STAGE DAMPENING MECHANISM HAVING A FURTHER VIBRATION DAMPENING MECHANISM THAT FUNCTIONS IN BOTH STAGES OF DAMPENING

(75) Inventors: Hiroshi Mizukami; Mamoru Ohkubo, both of Neyagawa (JP)

(73) Assignee: Exedy Corporation, Osaka (JP)

(*) Notice: Subject to any disclaimer, the term of this patent is extended or adjusted under 35 U.S.C. 154(b) by 0 days.

(21) Appl. No.: 09/277,065

(22) Filed: Mar. 26, 1999

(30) Foreign Application Priority Data

Mar. 30, 1998 (JP) .................................................. 10-084366
Mar. 30, 1998 (JP) .................................................. 10-084367

(51) Int. Cl.$^7$ .................................................. F16D 03/12
(52) U.S. Cl. .............................. 464/68; 464/64; 464/66; 192/213.21
(58) Field of Search ................................. 464/64, 66, 68; 192/213.21

(56) References Cited

U.S. PATENT DOCUMENTS

| | | |
|---|---|---|
| 4,645,053 | 2/1987 | Kitayama . |
| 4,669,594 | 6/1987 | Weissenberger et al. . |
| 4,685,896 * | 8/1987 | Carmillet et al. .................. 464/68 |
| 4,700,821 | 10/1987 | Maucher et al. . |
| 4,789,374 | 12/1988 | Suzuki . |
| 5,322,474 | 6/1994 | Hashimoto et al. . |
| 5,505,288 | 4/1996 | Tomiyama et al. . |
| 5,711,407 | 1/1998 | Maier . |
| 5,722,895 | 3/1998 | Graton et al. . |
| 5,788,041 | 8/1998 | Viola et al. . |
| 5,839,962 | 11/1998 | Rohs et al. . |
| 5,848,937 | 12/1998 | Mizukami et al. . |
| 5,857,914 | 1/1999 | Matsuoka . |
| 5,890,576 * | 4/1999 | Imanaka et al. ........................ 464/68 |
| 5,893,446 * | 4/1999 | Honjo et al. ..................... 192/213.22 |
| 5,899,812 * | 5/1999 | Nagano et al. .................. 192/213.21 |
| 5,954,585 | 9/1999 | Nagano et al. . |
| 6,019,206 | 2/2000 | Rohs et al. . |
| 6,050,383 * | 4/2000 | Hashimoto et al. ............. 192/213.12 |
| 6,056,103 * | 5/2000 | Hashimoto et al. ............. 192/213.12 |

* cited by examiner

*Primary Examiner*—Lynne H. Browne
*Assistant Examiner*—Aaron Dunwoody
(74) *Attorney, Agent, or Firm*—Shinjyu Global IP Counselors, LLP

(57) ABSTRACT

A clutch disk assembly 1 includes an output rotary member 3, an input rotary member 2, a first spring 7, a second spring 8 and a friction generating mechanism 13. The first spring 7 circumferentially and elastically couples the output and input rotary members 3 and 2 together, and is compressed in a first stage in which a torsion angle between them does not exceed a first torsion angle 1. The second spring 8 is compressed in a second stage in which the torsion angle between the output and input rotary members 3 and 2 exceeds the first torsion angle 1, and provides a rigidity in the second stage higher than a rigidity in the first stage. The friction generating mechanism 13 circumferentially and frictionally engages the input and output rotary members 2 and 3 with each other, and can generate slide in the first and second stages. The friction suppressing means (12 and 14) keeps the friction generating mechanism 13 from generating slide in response to the torsional vibrations not exceeding the predetermined torque in the first and second stages.

7 Claims, 20 Drawing Sheets

CLUTCH DISK ASSEMBLY HAVING A TWO STAGE DAMPENING MECHANISM HAVING A FURTHER VIBRATION DAMPENING MECHANISM THAT FUNCTIONS IN BOTH STAGES OF DAMPENING

BACKGROUND OF THE INVENTION

A. Field of the Invention

The invention relates to a damper mechanism and particularly to a damper mechanism for damping torsional vibrations in a power transmission system.

B. Description of the Background Art

A clutch disk assembly used in, for instance an automotive vehicle, is typically installed in a clutch mechanism such that the clutch disk assembly can be used in clutch engagement and clutch dis-engagement operations for transmitting torque from a flywheel to a transmission input shaft. The clutch disk assembly preferably also includes a vibration dampening function for absorbing and damping vibration transmitted from the flywheel. Generally, vibrations of a vehicle include idling noises (rattle), driving noises (acceleration/deceleration rattle and muffled noises) and tip-in/tip-out (low frequency vibrations). The clutch disk assembly has the above damper function for removing these noises and vibrations.

The idling noises are rattling noises which occur from a transmission when the transmission is in a neutral position, e.g., during waiting at traffic signals with clutch pedal off. This rattling occurs due to the fact that engine torque is low in an engine idling range and engine combustion causes large torque variations in the idling range. In this state, gear contact occurs between an input gear and a counter gear of a transmission, and thereby noises are produced.

The tip-in/tip-out low frequency vibrations are large longitudinal vibrations of a vehicle which occur when a driver rapidly depresses or releases an accelerator with the clutch in an engaged, torque transmitting condition. If rigidity of a drive transmission system is low, torque transmitted to wheels is transmitted or reflected from the wheels back through the drive train creating large oscillations of torque.

In a state where no torque is transmitted (zero torque transmission), for instance during idling, the dampening characteristics of most clutch disk assemblies are such that idling vibrations cannot be adequately dampened creating corresponding noises. Therefore, a low torsional rigidity is preferable in this region of zero torque transmission. Contrarily, it is necessary to maximize the rigidity of the torsion characteristics of the clutch disk assembly for suppressing the longitudinal vibrations of the tip-in/tip-out.

For overcoming the above problems, a clutch disk assembly which uses two kinds of springs for achieving vibration dampening characteristics in two separate stages has been provided. This structure has a low torsional rigidity and a low hysteresis torque in the first stage of a low torsion angle, and therefore can achieve an effect of preventing noises during idling. Since the torsional rigidity and the hysteresis torque are high in the second stage of a high torsion angle, the longitudinal vibrations at the time of tip-in/tip-out can be effectively damped.

A damper mechanism is already known where operation of a high hysteresis torque generating mechanism in a second stage with a high torsion angle is prevented when minute vibrations caused, e.g., by combustion variations of an engine are supplied in the second stage region. Thereby the minute vibrations are effectively absorbed by a low hysteresis torque.

In a damper mechanism of the conventional clutch disk assembly described above, torsional operation is repeated through a wide angular range in and between the positive second stage and the negative second stage in the torsion characteristic when low frequency vibrations are supplied thereto. Therefore, only a low hysteresis torque is generated in the region of the positive and negative first stages between the positive and negative second stages. Accordingly, all of the vibrations can be damped only to a small extent, and low frequency vibrations cannot be damped sufficiently. Further, the regions of the positive and negative first stages may form a gap or space in the torsion characteristics, resulting in an undesirable increase in longitudinal vibrations.

SUMMARY OF THE INVENTION

One object of the invention is to allow effective damping of torsional vibrations caused by torsion in and between positive and negative second stages in a damper mechanism having torsion characteristics in two stages.

In accordance with one aspect of the present invention, a damper mechanism includes a first rotary member and a second rotary member. The secondary rotary member is coupled to the first rotary member for relative rotary displacement with respect to the first rotary member about a central rotary axis. The relative rotary displacement occurs in a rotating direction defined about the central rotary axis. A first elastic member elastically couples the first and second rotary members together in the rotating direction. The first elastic member is compressible in a first stage of the relative rotary displacement between the first and second rotary members, the first stage being confined within a first torsion angle. A second elastic member elastically couples the first and second rotary members together in the rotating direction, and is compressible in a second stage of the relative rotary displacement between the first and second rotary members. The second stage is defined by an second torsion angle that exceeds the first torsion angle in circumferential size. The second elastic member provides rigidity in the second stage. The rigidity of the second elastic member is greater than the rigidity of the first elastic member in the first stage. A friction generating mechanism frictionally couples the first and second rotary members to each other in the rotating direction. The friction generating mechanism is configured to allow sliding between the first and second rotary members within both of the first and second stages. A friction suppressing means prevents sliding of the friction generating mechanism in response to torsional vibrations having a magnitude less than a predetermined torque in the first and second stages.

Preferably, a separate plate is operably disposed between the first and second rotary members. The first elastic member is disposed between the first rotary member and the separated plate. The second elastic member is disposed between the separate plate and the second rotary member.

Preferably, a second friction suppressing mechanism suppresses sliding in the friction generating mechanism in response to torsional vibrations having a magnitude less than a predetermined torque in the first stage.

In accordance with another aspect of the present invention, a damper mechanism includes a first rotary member and a second rotary member coupled to the first rotary member for relative rotary displacement with respect to the first rotary member about a central rotary axis. The relative rotary displacement occurs in a rotating direction defined about the central rotary axis. A first elastic member elastically couples the first and second rotary members together in the rotating direction. The first elastic member is compressible in a first stage of the relative rotary displacement between the first and second rotary members. The first stage is confined within a first torsion angle. A second elastic member elastically couples the first and second rotary members together in the rotating direction, and is compressible in a second stage of the relative rotary displacement between the first and second rotary members. The second stage is defined by an second torsion angle that exceeds the first torsion angle in circumferential size. The second elastic member provides rigidity in the second stage that is greater than rigidity of the first elastic member in the first stage. A friction generating mechanism frictionally couples the first and second rotary members to each other in the rotating direction. The friction generating mechanism is configured to refrain from sliding in response to torsional vibrations of less than a predetermined torque in the first and second stages, and the friction generating mechanism is configured to slide in response to torsional vibrations exceeding the predetermined torque to generate friction.

In accordance with yet another aspect of the present invention, a damper mechanism includes a first rotary member and a second rotary member coupled to the first rotary member for relative rotary displacement with respect to the first rotary member about a central rotary axis. The relative rotary displacement occurs in a rotating direction defined about the central rotary axis. A first elastic member elastically couples the first and second rotary members together in the rotating direction. The first elastic member is compressible in a first stage of the relative rotary displacement between the first and second rotary members. The first stage is confined within a first torsion angle. A second elastic member elastically couples the first and second rotary members together in the rotating direction, and is compressible in a second stage of the relative rotary displacement between the first and second rotary members. The second stage is defined by an second torsion angle that exceeds the first torsion angle in circumferential size. The second elastic member provides rigidity in the second stage that is greater than rigidity of the first elastic member in the first stage. A friction generating mechanism frictionally couples the first and second rotary members to each other in the rotating direction. The friction generating mechanism is configured for generating friction in response to relative rotation between the first and second rotary members in the first and second stages. A first friction suppressing mechanism suppresses friction generation in the friction generating mechanism in response to torsional vibrations having a magnitude less than a predetermined torque in the first stage. A second friction suppressing mechanism suppresses friction generation of the friction generating mechanism in response to torsion vibrations not exceeding the predetermined torque in the second stage.

It should be understood that the above-mentioned first and second friction suppressing mechanisms are stoppers which limit relative rotary displacement between corresponding elements.

In accordance with still another aspect of the present invention, a damper mechanism includes a first rotary member and a second rotary member. The secondary rotary member is coupled to the first rotary member for relative rotary displacement with respect to the first rotary member about a central rotary axis. The relative rotary displacement occurs in a rotating direction defined about the central rotary axis. A first damper mechanism is provided for coupling the first and second rotary members together in the rotating direction and damping torsional vibrations therebetween. The first damper mechanism includes:

a first intermediate member operably disposed between the first and second rotary members;

a first elastic member disposed between the first rotary member and the first intermediate member, the first elastic member being compressible therebetween within a portion of the relative rotary displacement defined by a first circumferential angle; and, a second elastic member disposed between the first intermediate member and the second rotary member having a spring constant larger than a spring constant of the first elastic member.

A second damper mechanism couples the first and second rotary members together in the rotating direction, arranged in parallel with the first damper mechanism for damping torsional vibrations. The second damper mechanism includes:

a second intermediate member operably disposed between the first and second rotary members;

a stop operable within a second portion of the relative rotary displacement defined by a second circumferential angle that is smaller than the first circumferential angle; and a friction generating mechanism frictionally engaging the second intermediate member and the second rotary member in the rotating direction, wherein, a portion of the second intermediate member is formed with a space with respect to the second elastic member, the space defining a third circumferential angle with the damper mechanism in a torsion free state, the third circumferential angle being larger than a difference between the first and second circumferential angles.

In accordance with still yet another aspect of the present invention, a damper mechanism includes a hub and a pair of input plates configured for connection to friction clutch members. The pair of input plates is coupled to the hub for relative rotary displacement with respect thereto about a central rotary axis. The relative rotary displacement occurs in a rotating direction defined about the central rotary axis. A first intermediate member is disposed at a radially outward side of the hub. The first intermediate member extends between the pair of input plates. The first intermediate member is rotatable with respect to the hub within a first circumferential angle. A first elastic member elastically couples the hub and the pair of input plates to each other in the rotating direction. The hub and the first intermediate member are relatively rotatable with respect to one another within an angular range defined by a first circumferential angle. A second elastic member elastically couples the first intermediate member and the pair of input plates in the rotating direction. The second elastic member has a spring constant larger than a spring constant of the first elastic member. A second intermediate member is disposed between the hub and the pair of input plates. A portion of the second intermediate member is contactable with a portion of the hub in response to rotation therebetween. The portion of the intermediate member is spaced apart from the portion of the hub by a second circumferential angle smaller than the first circumferential angle. The portion of the second intermediate member and the portion of the hub define a first stop. The second intermediate member is further formed with a second portion engageable with the second elastic member in response to rotation between the second intermediate member and the pair of input plates. The second portion is spaced apart from the second elastic member by a third circumferential angle, the third circumferential angle being larger than a difference between the first and second circumferential angles.

Preferably, the damper mechanism further includes a friction generating mechanism frictionally coupling the hub and the pair of input plates to each other in the rotating direction. The friction generating mechanism is configured for generating friction in response to relative rotation between the hub and the pair of input plates.

Preferably, the friction generating mechanism includes a first friction washer fixed to one of the pair of input plates. The first friction washer contacts the second intermediate plate for creating friction with respect thereto in response to rotation between the pair of input plates and the second intermediate plate.

Preferably, the friction generating mechanism further includes a second friction washer connected to the first friction washer for rotation therewith. The second friction washer contacts the hub for creating friction with respect thereto in response to rotation between the pair of input plates and the hub.

According to the above described aspect of the present invention, when a torque is supplied to the second rotary member, the torque is transmitted to the first rotary member through the first and second damper mechanisms arranged in parallel. The first damper mechanism functions in a range of a small torsion angle, and the second damper mechanism functions in a range of a large torsion angle.

Torsion characteristics of the damper mechanism of the first aspect are described below. The following description is given on the operation when the first rotary member twists in one direction with respect to the second rotary member. In a first stage smaller than the first circumferential angle, the first elastic member is compressed to produce characteristics of a relatively low rigidity. At the same time, sliding occurs in the friction generating mechanism to produce a high hysteresis torque. When the torsion angle exceeds the first circumferential angle, the second elastic member is compressed to produce characteristics of a relatively high rigidity. In this operation, sliding occurs in the friction generating mechanism to produce characteristics of a high hysteresis torque. As described above, the characteristic of a high hysteresis torque is produced in both the first and second stages. This is effective for vibrations of a relatively large torsion angle such as longitudinal vibrations of a vehicle body.

When minute vibrations of a small torque are supplied in the first stage, the second intermediate member can rotate relatively to the first rotary member through a degree corresponding to the space of the second circumferential angle between the second intermediate member and the first rotary member. Thus, no sliding occurs in the friction generating mechanism in this range of the second circumferential angle.

When minute torsional vibrations are supplied in the second stage, a space of an angle which is equal to a sum of a difference between the third and first circumferential angles and the second circumferential angle is initially kept between the second intermediate member and the second elastic member. Through the angular range of this space in the second stage, the second elastic member does not act on the second intermediate member, and the second intermediate member can rotate together with the second rotary member. Thus, no sliding occurs in the friction generating mechanism.

As described above, when minute torsional vibrations are supplied in the first and second stages, the friction generating mechanism does not operate, and therefore does not generate a high hysteresis torque. As a result, the minute torsional vibrations can be effectively absorbed.

DESCRIPTION OF THE PREFERRED EMBODIMENTS

Figure 1:
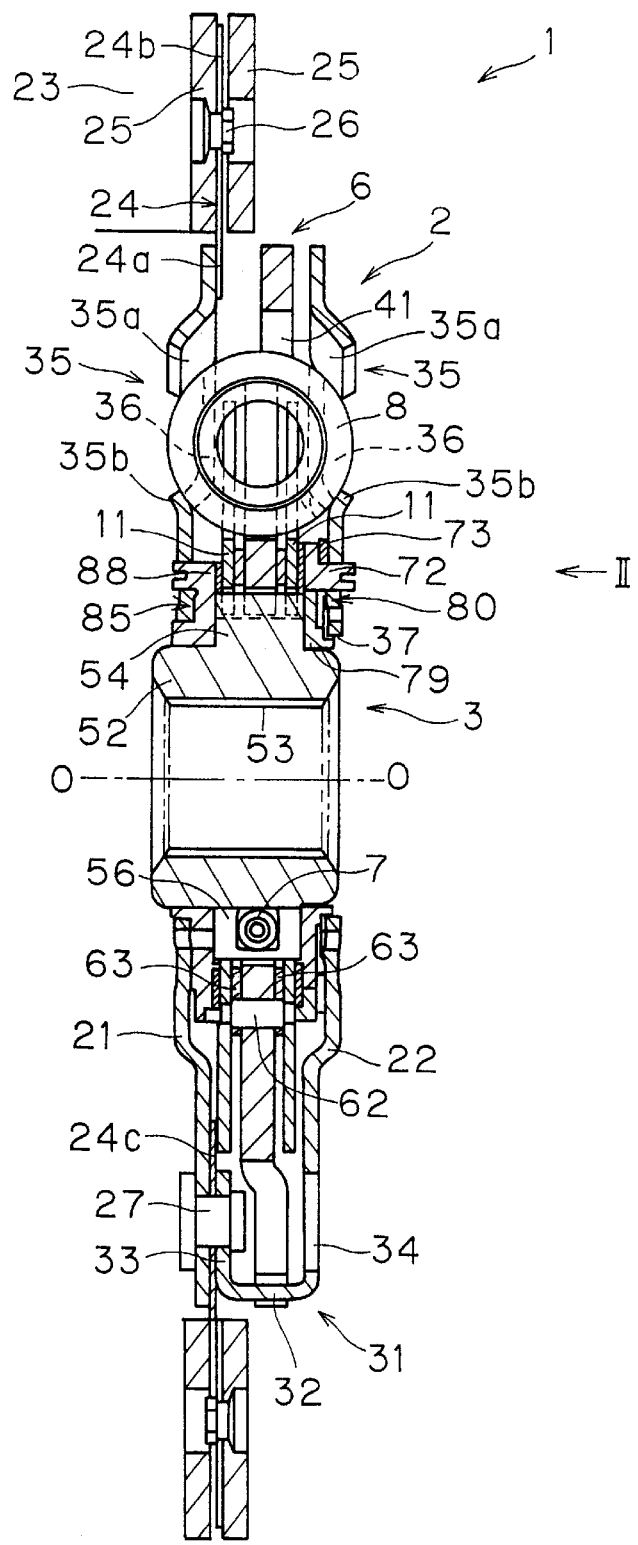
FIG. 1 is a cross-sectional side view of a clutch disk assembly in accordance with one embodiment of the present invention, taken along a line II.
Figure 2:
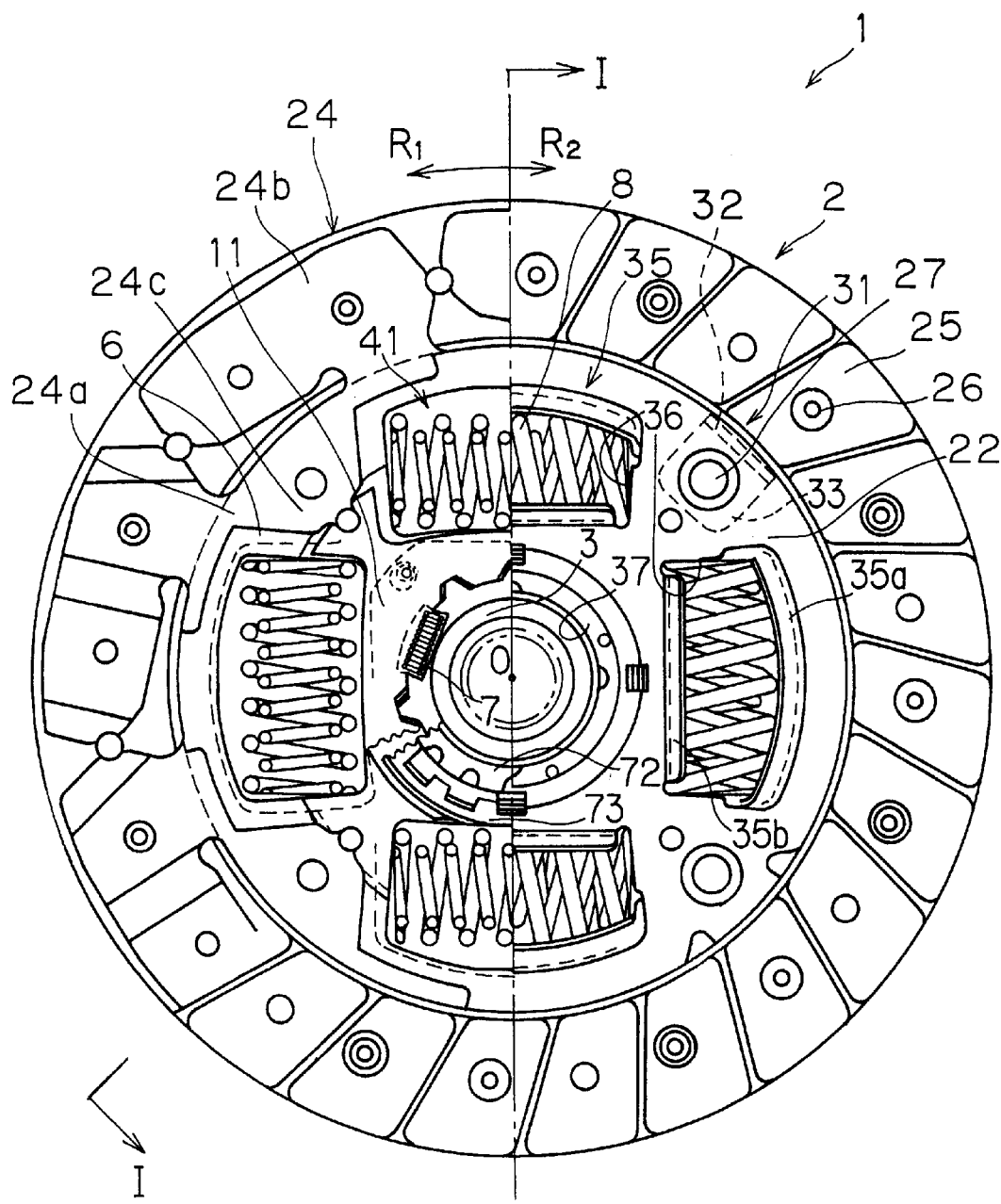
FIG. 2 is a partial cutaway elevational view of the clutch disk assembly depicted in FIG. 1.

FIG. 1 is a cross-sectional view of a clutch disk assembly 1 of one embodiment of the present invention and FIG. 2 is an elevational view. The clutch disk assembly 1 is for use with a clutch mechanism (not shown) installed in a power transmission device (not shown). The clutch disk assembly in the clutch mechanism effects engagement and disengagement of torque transmission in the power transmission device. The clutch disk assembly functions to dampen vibrations, as is described below. The damper function absorbs and/or dampens torque variations or the like, which are transmitted from a flywheel side of the transmission device though the use of springs and related structure, as is described further below.

In FIG. 1, 0—0 represents a central rotation axis of the clutch disk assembly. An engine and the flywheel (both not shown) are arranged on the left side in FIG. 1, and a transmission (not shown) is arranged on the right side in FIG. 2. As seen in FIG. 2, R1 indicates a rotating direction (positive side) of the clutch disk assembly 1, and R2 indicates a reverse direction (negative side). Hereinafter, the term transmission side refers to the right side of FIG. 1, and the term engine side refers to the left side of FIG. 1.

The clutch disk assembly 1 is basically formed of an input rotary member 2, an output rotary member 3 and a damper mechanism arranged between the input and output rotary members 2 and 3. The damper mechanism includes first springs 7, second springs 8, a friction generating mechanism 13 and other elements described further below.

The input rotary member 2 is a member which is supplied with a torque from a flywheel (not shown). The input rotary member 2 is basically formed of the clutch plate 21, retaining plate 22 and clutch disk 23. The clutch plate 21 and the retaining plate 22 are both made of pressed circular or annular metal plates, and are axially spaced by a predetermined distance from each other. The clutch plate 21 is arranged on the engine side, and the retaining plate 22 is arranged on the transmission side. The clutch and retaining plates 21 and 22 are fixed together by plate-like coupling portions 31, described below, so that a predetermined annular space is defined between the plates 21 and 22. The plates 21 and 22 therefore rotate together as a single rigid member.

The clutch disk 23 is provided for engagement with the flywheel (not shown). The clutch disk 23 is basically formed of a cushioning plate 24 as well as first and second friction facings 25. The cushioning plate 24 is formed with an annular portion 24a, a plurality of cushioning portions 24b formed on the outer periphery of the annular portion 24a, the cushioning portion 24b being circumferentially spaced apart from one another, and a plurality of coupling portions 24c extending radially inward from the annular portion. There are four coupling portions 24c each being fixed to the clutch plate 21 by a rivet 27, as is described below. The friction facings 25 are fixed to the opposite surfaces of each cushioning portion 24b of the cushioning plate 24 by rivets 26.

Each of the clutch and retaining plates 21 and 22 is provided at its radially outer portion with four windows 35 which are equally spaced from one another in the rotating direction. Each window 35 is provided at its inner and outer peripheries with cut and bent portions 35a and 35b, respectively. The cut and bent portions 35a and 35b are provided for restricting axial and radial movement of the second spring 8, as is described below. Each window 35 is also provided at its circumferentially opposite ends with contact portions 36 which are in contact with or close to the ends of the second spring 8, respectively.

Figure 5:
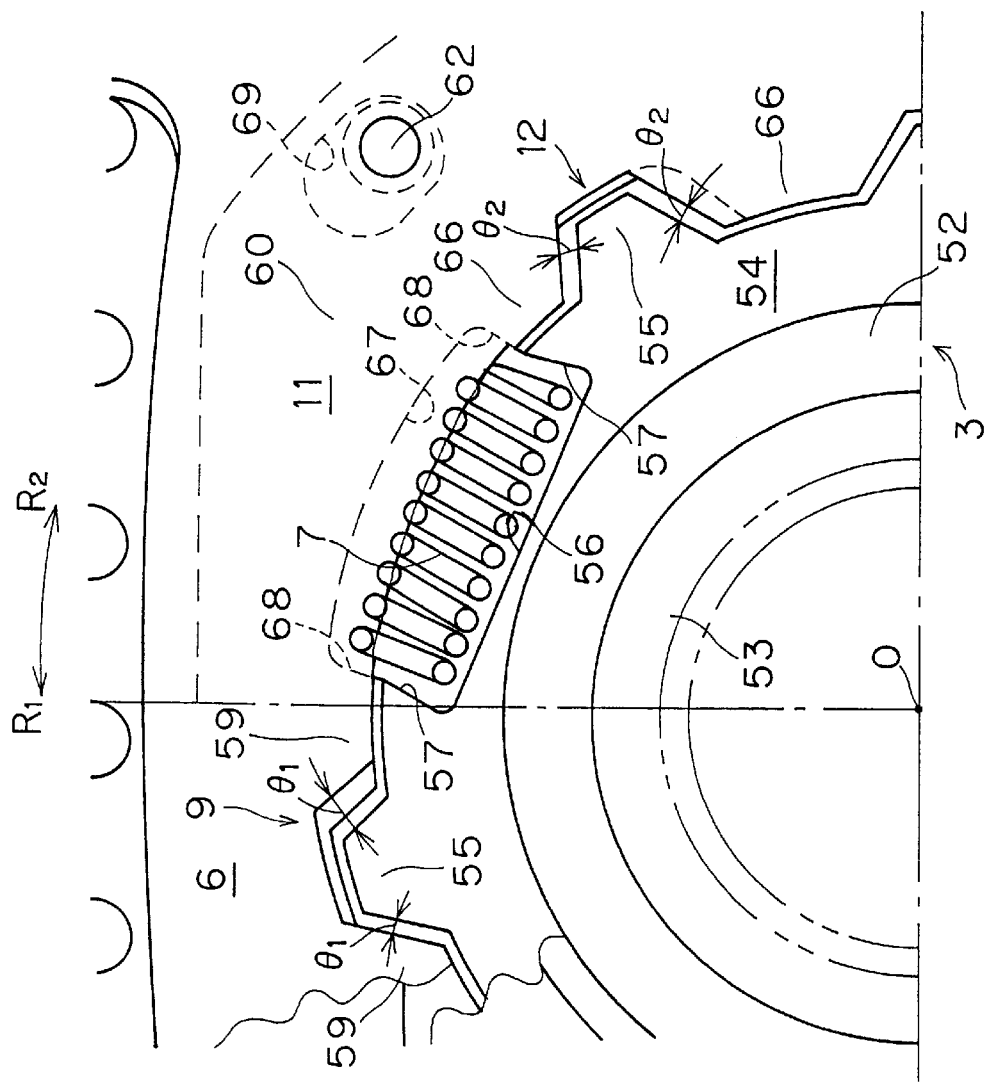
FIG. 5 is fragmentary, partial cutaway elevational view showing details of engagement between a hub, a separated flange and an intermediate plate of the clutch disk assembly depicted in FIGS. 1, 2, 3 and 4.

The clutch and retaining plates 21 and 22 have central apertures 37 (inner peripheries). A spline hub forming the output rotary member 3 is arranged in the central apertures 37. The output rotary member 3 is formed of an axially extending cylindrical boss 52, and a flange 54 extending radially from the boss 52. The inner periphery of the boss 52 forms a spline aperture 53 engaged with a shaft extending from the transmission (not shown). As seen in FIG. 5, the flange 54 is provided with a plurality of outer teeth 55 arranged in the rotating direction as well as recesses 56 or the like for accommodating the first springs 7, as is described below. The recesses 56 are preferably located at two diametrically opposed positions, respectively.

As seen in FIG. 1, a separated flange 6 is a circular plate member which is arranged radially outside the output rotary member 3 and particularly between the clutch and retaining plates 21 and 22. The separated flange 6 is elastically coupled to the output rotary member 3 in the rotating direction through the first springs 7, and is further coupled elastically to the input rotary member 2 through the second springs 8. As depicted more specifically in FIG. 5, the separated flange 6 is provided at its inner periphery with a plurality of inner teeth 59. The inner teeth 59 are arranged between the outer teeth 55, and are spaced by a predetermined angle in the rotating direction from the outer teeth 55. The outer and inner teeth 55 and 59 can come into contact with each other in response to rotation therebetween. Thus, the outer and inner teeth 55 and 59 form a first stop 9 for limiting relative rotary displacement between the input rotary member 3 and the separated flange 6. A first torsion angle $\theta_1$ is defined between adjacent sides of each outer tooth 55 and each inner tooth 59 with the clutch disk assembly 1 in a torsion free state, as shown in FIG. 5. The first torsion angle $\theta_1$ between each outer tooth 55 and the neighboring inner tooth 59 on the R1 side is about 2 degrees, and the first torsion angle $\theta_1$ between each outer tooth 55 and the neighboring inner tooth 59 on the R2 side is about 5 degrees, as shown in FIG. 5. Therefore, a total displacement of about 7 degrees is possible between each outer tooth 55 and each corresponding tooth 59.

It should be understood that the first torsion angle $\theta_1$ defines a first stage of relative rotary displacement between the output rotary member 3 and the input rotary member 2 since, in the first stage defined above, the separate flange 6 generally rotates with respect to the output rotary member 3 and the separate flange 6 usually rotates with the clutch and retaining plates 21 and 22.

The separated flange 6 is provided at its inner periphery with recesses 67 corresponding to the recesses 56 of the flange 54, respectively, as is shown more clearly in FIG. 5. There are preferably two first springs 7. Each first spring 7 is disposed in corresponding recesses 56 and 67. Each first spring 7 is a relatively soft coil spring having a generally low spring constant. The two first springs 7 operate in parallel. Each first spring 7 has circumferentially opposite ends engaged with circumferentially opposite ends 57 and 68 of the recesses 56 and 67 through spring seats that are fitted to each end of each first spring 7. According to the above structure, the first springs 7 are compressed in response to rotation within a torsion angle of displacement in the first stage corresponding to the first torsion angle $\theta_1$, where the output rotary member 3 and the separated flange 6 have rotated relative to each other.

Figure 3:
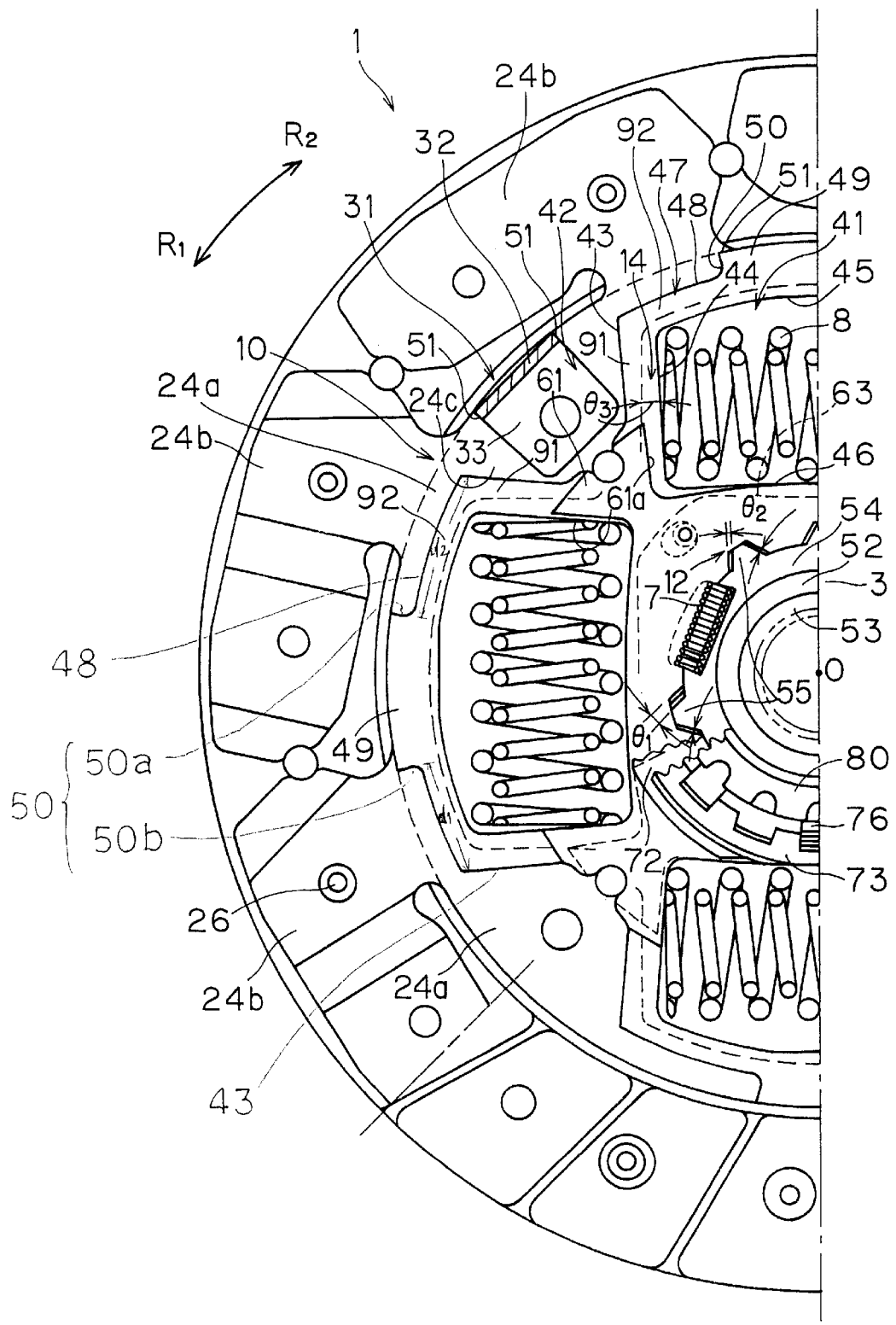
FIG. 3 is a an enlarged partial cutaway elevational view of a portion of the clutch disk assembly depicted in FIG. 2.

Referring now to FIGS. 2 and 3, the separated flange 6 is provided with four circumferentially equally spaced apart windows 41. Each window 41 is elongated in the rotating direction (circumferential direction). The edge of the window 41 forms contact portions 44 on the circumferentially opposite sides, an outer peripheral portion 45 on the radially outer side and an inner peripheral portion 46 on the radially inner side. The outer peripheral portion 45 continuously extends to close the radially outer side of the window 41.

Each window 41 is closed on all sides within a plane defined by the separated flange 6 but may alternatively have an outer peripheral portion which is partially opened radially outward.

The separated flange 6 is also provided with recesses 42 located between the circumferentially neighboring windows 41. Each recess 42 is defined by radial outer surfaces of the separate flange 6, as described in greater detail below. Each recess 42 has a radially outwardly diverging form, and edge surfaces 43 are formed on its circumferentially opposite sides, respectively.

Each recess 42 (identified in FIG. 3) is separated by the circumferential sides of the windows 41 and also by projections 49 located radially outside the windows 41 on a radially outward portion of the separated flange 6. Each projection 49 extends radially outward from an outer periphery 48 of the separated flange 6. Each projection 49 is elongated in the rotating direction, and is provided with stop surfaces 50. Each projection 49 has a circumferential length that is shorter than the circumferential length of a corresponding window 41, and is located radially outside a circumferentially middle portion of the window 41. Further, as shown in FIG. 3, stop surfaces 50 of the projection 49 are circumferentially offset with respect to a circumferential center of the window 41. In other words, the surface 50a is a first distance d1 away from an adjacent edge surface 43, the surface 50b is a second distance d2 away from an adjacent edge surface 43, the distance d2 being greater than the distance d1.

Although the projection 49 is shown offset from a center of each window 41, it is also possible to position the projection 49 in a central location with respect to the window 41 by the above configuration. Further, the projection 49 need not necessarily be a continuous solid projection. Alternatively, the stop surfaces 50a and 50b could be formed by separate protrusions thereby making it possible to have the windows 41 be open in a radial outward portion thereof.

The above structure of the separated flange 6 is described below in another manner. The separated flange 6 has an annular portion that defines its radially inner portion, and also has a plurality of projections 47 (identified in FIG. 3) extending radially outward from the annular portion. In the present embodiment, there are four projections 47 that are equally spaced apart from one other in the rotating direction. Each projection 47 is elongated in the rotating direction, and each projection 47 is formed with one of the above described windows 41. Each window 41 occupies 70% or more of an area of the projection 47, and is formed in a major portion of the projection 47.

Described from a another viewpoint, each projection 47 is defined by radially extending two window frame portions 91 on circumferentially opposite sides thereof. A radially outer window frame portion 92 couples the radially outer ends of the circumferentially opposite side frame portions 91 together. The circumferentially inner side of each side frame portion 91 forms the contact portion 44, and the circumferentially outer side thereof forms the edge surface 43. The radially inner side of the radially outer frame portion 92 forms the outer peripheral portion 45, and the radially outer side thereof forms the outer periphery 48. The projection 49 already described is formed on the outer periphery 48. The recess 42 described above can also be considered to be a space between the circumferentially opposite side frame portions 91 of the projections 47 neighboring to each other in the rotating direction.

Figure 7:
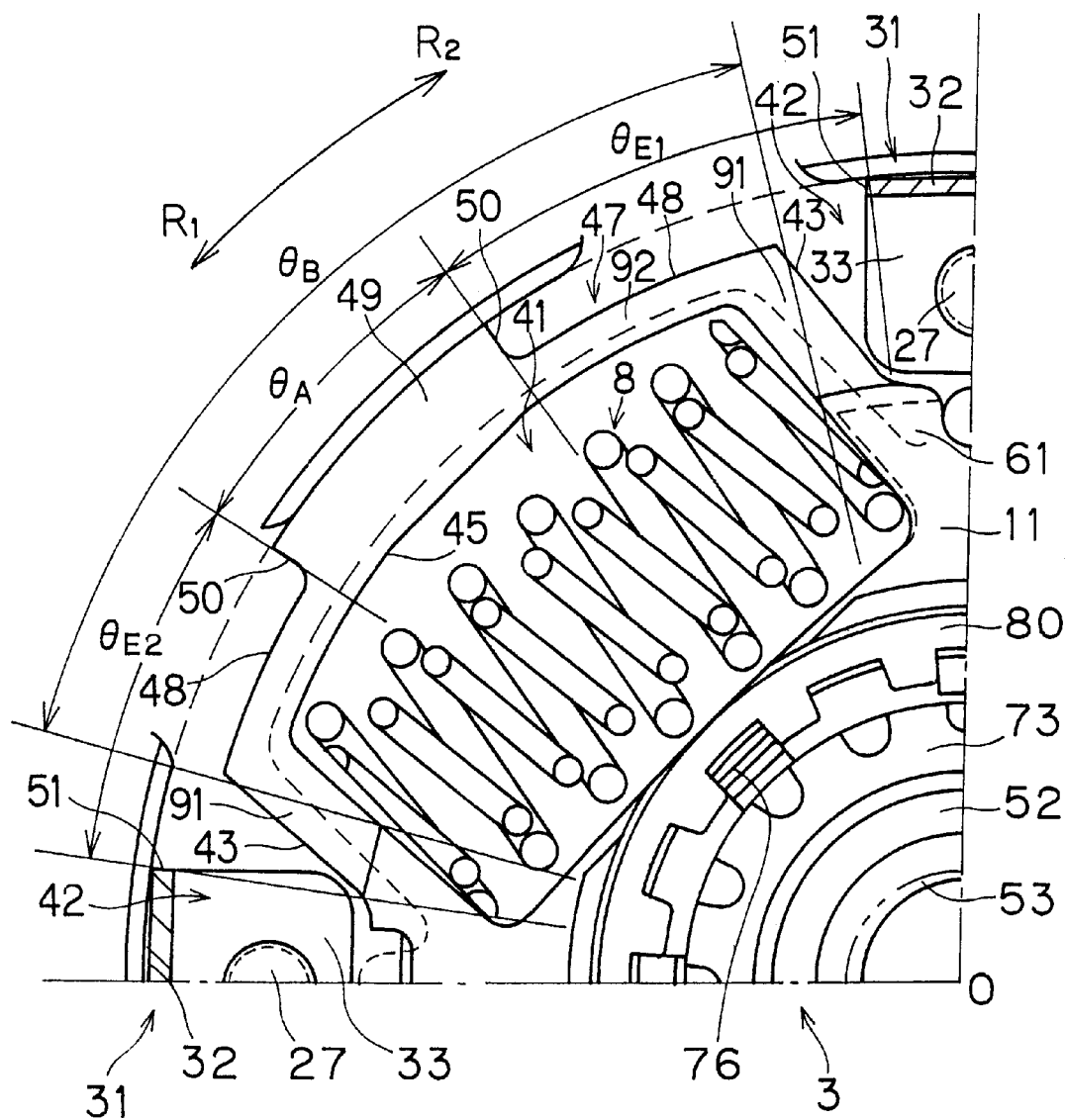
FIG. 7 is another fragmentary elevational view, similar to FIG. 6, showing relationships between torsion angles defined on respective portions of the clutch disk assembly depicted in FIGS. 1–6.

The second spring 8 is an elastic member, i.e., a spring used in the damper mechanism of the clutch disk assembly 1. Each second spring 8 is formed of a pair of coaxial coil springs. Each second spring 8 is larger than each first spring 7, and has a spring constant larger than the spring constant of the first spring 7. Each second spring 8 is arranged in the windows 41 and 35. The second spring 8 is circumferentially long, and extends the circumferential length of the window 41. Thus, as seen in FIG. 7, the second spring 8 has a circumferential angle substantially equal to a circumferential angle $\theta_B$ of the window 41, described in greater detail below. As shown in FIG. 3, the circumferentially opposite ends of each second spring 8 are in contact with or close to the contact surfaces 36 and the contact portions 44 of the window 41. Referring to FIG. 1, torque transmitted to the plates 21 and 22 can be transmitted to the separated flange 6 through the second springs 8. When the plates 21 and 22 rotate relatively to the separated flange 6, the second springs 8 are compressed therebetween. More specifically, as seen in FIGS. 2 and 3, each second spring 8 is compressed in the rotating direction between the contact surface 36 and the contact portion 44 circumferentially opposed to the contact surface 36. In this operation, the four second springs 8 operate in parallel. In a torsion free state where a torsion angle is zero between the separated flange 6 and the plates 21 and 22, the radially inner portion of each of the circumferentially opposite ends of the second spring 8 is in contact with or close to the contact portion 44, but the radially outer portion of each of the circumferentially opposite ends is slightly spaced from the contact portion 44, as is shown in FIG. 3.

As is shown in FIG. 1, the retaining plate 22 is provided at its outer periphery with the four plate-like coupling portions 31 which are equally spaced from each other in the rotating direction. The plate-like coupling portions 31 couple the clutch and retaining plates 21 and 22 together, and form a second stop in the clutch disk assembly 1 as is described below. Each plate-like coupling portion 31 is a plate member integral with the retaining plate 22, and has a predetermined circumferential width the rotating direction. The plate-like coupling portions 31 are located circumferentially between the windows 41 adjacent to corresponding recesses 42. Each plate-like coupling portion 31 is formed with a stop portion 32 extending axially from the outer periphery of the retaining plate 22, and a fixing portion 33 extending radially inward from the end of the stop portion 32. The stop portion 32 extends toward the clutch plate 21 from the outer periphery of the retaining plate 22. The fixing portion 33 is bent radially inward at the end of the stop portion 32.

Figure 4:
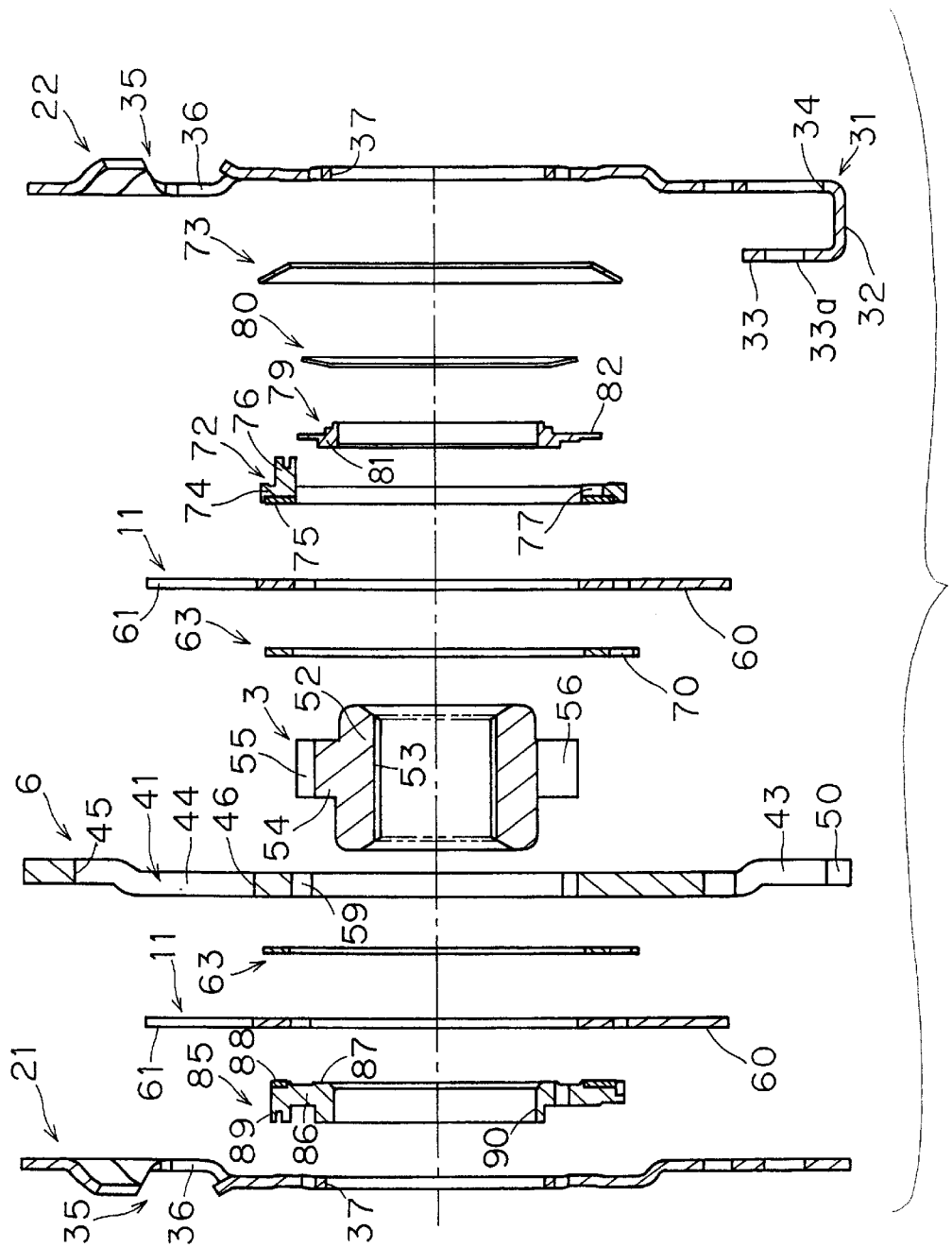
FIG. 4 is an exploded cross-sectional view of portions of the clutch disk assembly depicted in FIGS. 1, 2 and 3.

The plate-like coupling portion 31 described above is integral with the retaining plate 22, and has the substantially same thickness as the retaining plate 22. Therefore, the stop portion 32 has a small radial width corresponding to the thickness of the retaining plate 22. The stop portion 32 has stop surfaces 51 on its circumferentially opposite sides as is more clearly shown in FIGS. 3, 6 and 7. The fixing portion 33 is radially spaced apart from the axis O—O by a distance generally equal to the distance between a central portion of the windows 41 from the axis O—O, and the circumferential position of the fixing portion 33 is between the two windows 41 neighboring each other in the rotating direction with the clutch disk assembly 1 in a torsion free state. As a result, the fixing portions 33 are arranged correspondingly to the recesses 42 in the separated flange 6, respectively. The recess 42 is larger than the fixing portion 33. Therefore, the fixing portions 33 can move through the recesses 42, respectively, when the retaining plate 22 is moved axially toward the clutch plate 21 during assembly operations. Each fixing portion 33 is parallel with the coupling portion 24c of the cushioning plate 24 and is in contact with the surface thereof on the transmission side. As seen in FIGS. 1 and 4, the fixing portion 33 is provided with an aperture 33a, into which the foregoing rivet 27 is fitted. Each rivet 27 rigidly couples the fixing portion 33, the clutch plate 21 and the cushioning plate 24 together. The retaining plate 22 is provided with caulking apertures 34 at positions corresponding to the fixing portions 33, respectively for assembly purposes.

Description is now given of the second stop 10 formed of the stop portions 32 of the plate-like coupling portions 31 and the projections 49 as shown in FIG. 3. The second stop 10 is a mechanism for restricting relative rotation between the separated flange 6 and the input rotary member 2 within a torsion angle range corresponding to a torsion angle $\theta_4$, and for restricting the relative rotation between them over the torsion angle $\theta_4$ as seen in diagrammatical form in FIG. 8. It should be understood that rotation between the clutch and retaining plates 21 and 22, and the separate flange 6 within the torsion angle $\theta_4$ generally defines the second stage of relative rotation or angular displacement between the input and output rotary members 2 and 3. In the second stage of relative rotary displacement the second springs 8 are compressed between the separated flange 6 and the input rotary member 2 through the torsion angle $\theta_4$.

As shown in FIG. 3, each plate-like coupling portion 31 is located in a position circumferentially between the two windows 41, within the recess 42 and circumferentially between the two projections 49. The stop surfaces 51 of each plate-like coupling portion 31 are located radially outside the outer periphery 48 of the separated flange 6. Thus, the stop portion 32 and the projection 49 are in the substantially same radial positions. Therefore, the stop portion 32 and the projection 49 contact each other when the torsion angle between the separated flange 6 and the plates 21 and 22 increases to a value corresponding to the torsion angle $\theta_4$. When the stop surface 51 of the stop portion 32 is in contact with the stop surface 50 of the projection 49, the stop portion 32 is located radially adjacent to the projection 47 of the separated flange 6 and therefore radially outside the window 41. Thus, each stop portion 32 can move to a position radially outside the circumferentially inner portions of the projection 47 and the window 41.

Advantages of the second stop 10 described above are as follows. Since each stop portion 32 has a plate-like form, the radial length of the stop portion 32 is significantly shorter than a conventional stop pin. The radial length of the stop portion 32 is substantially equal to the thickness of the plate 21 or 22. This means that the substantial radial length of the second stop 10 is restricted to a small dimension corresponding to the thickness of the plate 21 or 22.

Each stop portion 32 is arranged in the outer peripheral portions, i.e., the radially outermost positions of the plates 21 and 22, and is located radially outside the projection 47 and particularly the outer periphery 48 of the window 41. Since the stopper portion 32 is radially shifted from the window 41, no interference occurs in the rotating direction between the stop portion 32 and the window 41. Consequently, both the maximum torsion angle of the damper mechanism allowed by the second springs 8 and the torsion angle of the second springs 8 can be increased. If the stop portion were in the same radial position as the window 41, interference would occur between the torsion angle of the damper mechanism determined by the second springs 8 and the circumferential angle of the window 41, and therefore it would be impossible to achieve a wide angle of the damper mechanism and low spring rigidity.

In particular, since the radial width of the second stop 10 is significantly shorter than that of a conventional stop pin, the second stop 10 may be located radially outside the window 41 but does not extremely increase the outer diameters of the plates 21 and 22. Also, the radial length of the window 41 is not extremely reduced.

Referring to FIG. 1, intermediate plates 11 are a pair of plate members, which are arranged radially outside the output rotary member 3, and particularly are located between the clutch plate 21 and the separated flange 6 and between the separated flange 6 and the retaining plate 22, respectively. The intermediate plates 11 are made of circular or annular plate members, respectively, and form a portion of the damper mechanism between the input and output rotary members 2 and 3. Each intermediate plate 11 is provided at its inner periphery with a plurality of inner teeth 66, as shown in FIG. 5. The inner teeth 66 axially overlap the inner teeth 59 of the separated flange 6. The inner teeth 66 are spaced in the rotating direction by a predetermined distance from the outer teeth 55 of the output rotary member 3 (hub), respectively. Through the range of this space, therefore, the output rotary member 3 and the intermediate plate 11 can rotate relatively to each other. The outer and inner teeth 55 and 59 form a third stop 12 for restricting the relative rotation angle between the output rotary member 3 and the intermediate plate 11. More specifically, as shown in FIG. 5, a space of second torsion angle $\theta_2$ is kept between each outer tooth 55 and each of the inner teeth 66 on the circumferentially opposite sides thereof. In this embodiment, the second torsion angles $\theta_2$ of the circumferential opposite spaces are equal to each other, and are about 2 degrees. The overall length of the second torsion angle $\theta_2$ is not larger than the overall length of the first torsion angle $\theta_1$, where the overall length of the first torsion angle $\theta_1$ here means the first torsion angle $\theta_1$ on the R1 side combined with the first torsion angle $\theta_1$ on the R2 side of the outer tooth 55, and the overall length of the second torsion angle $\theta_2$ means the the second torsion angle $\theta_2$ on the R1 side combined with the second torsion angle $\theta_2$ on the R2 side of each respective outer tooth 55.

Figure 6:
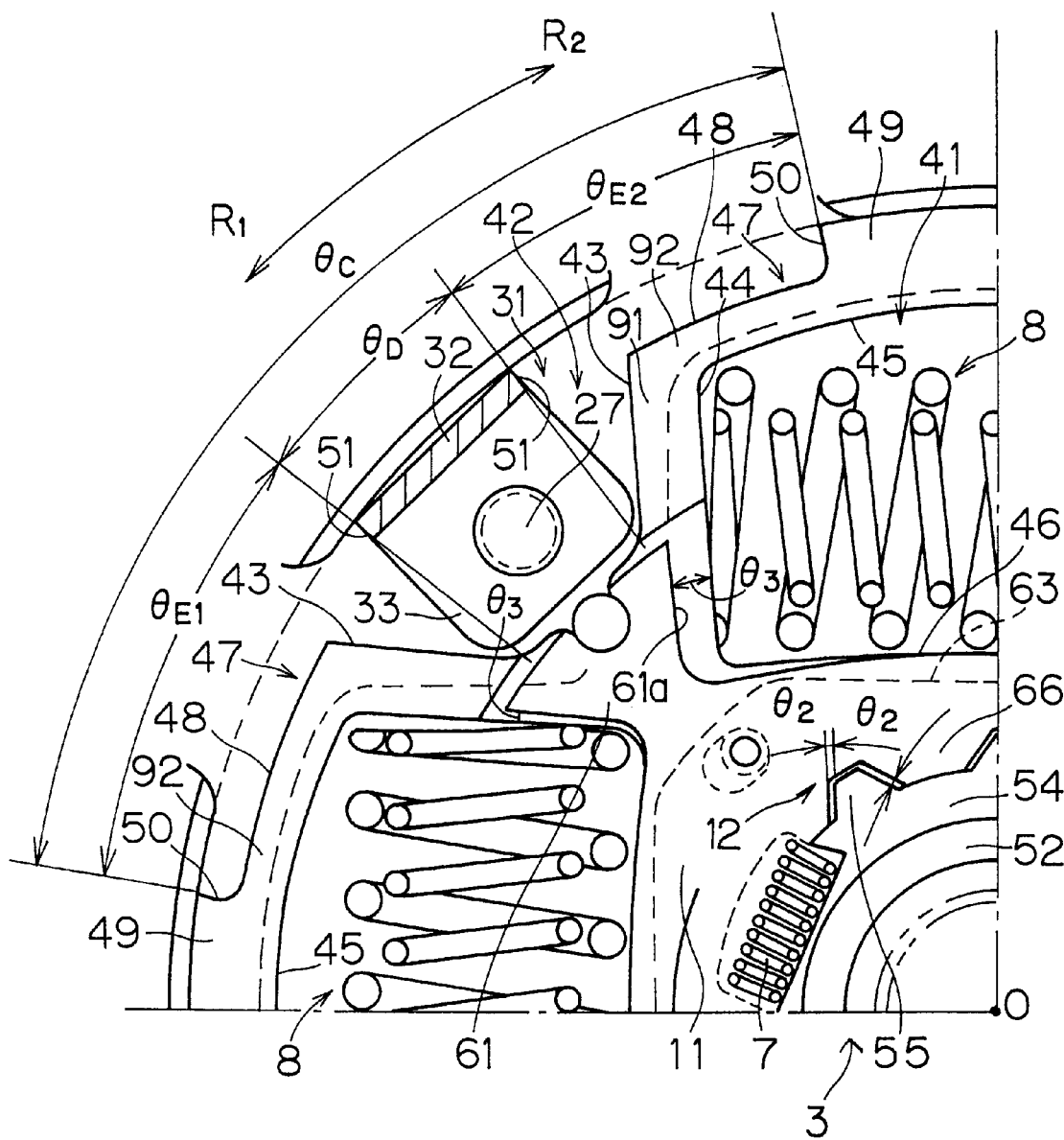
FIG. 6 is a fragmentary elevational view showing relationships between torsion angles defined on respective portions of the clutch disk assembly depicted in FIGS. 1–5.

Each intermediate plate 11 is provided with engagement portions 61 projecting radially outward, as shown in phantom in the upper portions of FIG. 3 and in FIG. 7. Each engagement portion 61 is arranged between the windows 45 of the separated flange 6. The engagement portion 61 has the radially outer end located proximate the radially mid-portion of the window 41. Each engagement portion 61 has a radially outwardly diverging form. The circumferentially opposite ends of each engagement portion 61 are engageable with the radially inner portions of the circumferential ends of the second springs 8 located on the circumferentially opposite sides thereof. Spaces having a circumferential length corresponding to third angles $\theta_3$ are defined between circumferentially opposite end surfaces 61a of each engagement portion 61 and the corresponding circumferential ends of the second springs 8, as shown in FIGS. 3 and 6. In this embodiment, the third angle $\theta_3$ between each engagement portion 61 and the second spring 8 on the R2 side is about 4 degrees, and the third angle $\theta_3$ to the second spring 8 on the R1 side thereof is about 1 degree (see FIG. 6). Each third angle $\theta_3$ is larger than the difference between the first and second torsion angles $\theta_1$ and $\theta_2$. This relationship is present among the respective angles corresponding circumferential sides thereof.

Referring to FIG. 1, the intermediate plates 11 are unrotatably coupled together by a plurality of pins 62. Each pin 62 is formed of a shank and projected portions projected axially from the opposite ends of the shank. The intermediate plates 11 are in axial contact with the shanks of the pins 62 and are confined thereby such that they are prevented from axially approaching each other. The projected portions are fitted into apertures in the plates 11, respectively. A spacer 63 is arranged between each intermediate plate 11 and the separated flange 6, as shown in FIG. 4. Each spacer 63 is an annular plate member which is arranged between the radially inner portion of the intermediate plate 11 and the radially inner annular portion of the separated flange 6. The spacer 63 is provided with apertures through which the shanks of pins 62 extend, respectively, and can rotate together with the intermediate plate 11 owing to engagement of the pins 62 in these apertures. Coating is applied to a surface of the spacer 63, which is in contact with the flange 6, for reducing the friction coefficient. The separated flange 6 is provided with long apertures 69 through which the pins 62 extend, respectively. The long apertures 69 allow the pins 62 to move in the rotating direction with respect to the separated flange 6.

Description is now given on members forming the friction generating mechanism which is depicted in an exploded view in FIG. 4. The second friction washer 72 is arranged between the inner peripheral portion of the intermediate plate 11 on the transmission side and the inner peripheral portion of the retaining plate 22. The second friction washer 72 is basically formed of a body 74 made of resin and a friction plate 75 molded on the body 74. The friction plate 75 is in contact with the surface, which is opposed to the transmission, of the intermediate plate 11 on the transmission side. Engagement portions 76 extend from the inner peripheral portion of the body 74 toward the transmission. The engagement portions 76 are non-rotatably engaged with the retaining plate 22, and are axially fitted to the plate 22. A plurality of concavities 77 are formed in the transmission side of the inner peripheral portion of the body 74. A second conical spring 73 is arranged between the body 74 and the retaining plate 22. The second conical spring 73 in the assembled state is compressed between the body 74 of the second friction washer 72 and the retaining plate 22. Thereby, the friction plate 75 of the second friction washer 72 is strongly pressed against the first intermediate plate 11. A first friction washer 79 is arranged between the flange 54 and the inner peripheral portion of the retaining plate 22. Thus, the first friction washer 79 is arranged radially inside the second friction washer 72 and radially outside the boss 52. The first friction washer 79 is made of resin. The first friction washer 79 is basically formed of an annular body 81, from which a plurality of projections 82 extend radially outward. The body 81 is in contact with the flange 54, and the projections 82 are non-rotatably engaged with the concavities 77 of the second friction washer 72. Thereby, the first friction washer 79 can rotate together with the retaining plate 22 with the second friction washer 72 therebetween. A first conical spring 80 is arranged between the first friction washer 79 and the inner peripheral portion of the retaining plate 22. The first conical spring 80 in the assembled state is axially compressed between the first friction washer 79 and the inner peripheral portion of the retaining plate 22. The biasing force of the first conical spring 80 is smaller than the biasing force of the second conical spring 73. Since the friction surface of the first friction washer 79 is formed on the resin portion, its friction coefficient is smaller than the second friction washer 72. Accordingly, the friction (hysteresis torque) produced by the first friction washer 79 is significantly smaller than the friction produced by the second friction washer 72.

A third friction washer 85 is arranged between the inner peripheral portion of the clutch plate 21, and the flange 54 and the inner peripheral portion of the intermediate plate 11. The third friction washer 85 is an annular member made of resin. The third friction washer 85 is basically formed of an annular body 86. A friction plate 88 is arranged on the radially outer portion of the surface of the annular body 86 opposed to the transmission, and a friction surface 87 of resin is formed on the radially inner portion of the surface of the body 86 opposed to the transmission. The friction plate 88 is in contact with the inner peripheral portion of the intermediate plate 11 on the engine side. The friction surface 87 (made of resin) is in contact with the surface of the flange 54 on the engine side. The third friction washer 85 is provided at its inner peripheral portion with an annular cylindrical portion 90 projecting toward the engine. The inner peripheral surface of the cylindrical portion 90 is in slidable contact with the outer peripheral surface of the boss 52. A plurality of engagement portions 89, which are spaced from each other in the rotating direction, project from the outer peripheral portion of the body 86 toward the engine. The engagement portions 89 are engaged into apertures formed in the clutch plate 21 so that the third friction washer 85 is unrotatably engaged with the clutch plate 21 and is axially fitted to the same. In the friction mechanism described above, the friction generating mechanism 13 which generates a relatively high hysteresis torque is formed between on the friction plate 75 of the second friction washer 72 and the friction plate 88 of the third friction washer 85, and the intermediate plate 11. Further, the friction surface on the body 81 of the first friction washer 79 and the resin friction surface 87 of the third friction washer 85 cooperate with the flange 54 to form a friction generating mechanism 15 which generates a relatively low hysteresis torque.

Angles and relationships relating to the second springs 8 and the second stop 10 will now be described below more in detail. The "circumferential angle" in the following description means the angle in the circumferential direction (i.e., rotating direction of the clutch disk assembly 1) between two positions around the rotation axis 0-0 of the clutch disk assembly 1. The absolute values of the angles, which will be used in the following description, are merely examples in the clutch disk assembly shown in the figures, and the invention is not restricted to these values.

Figure 20:
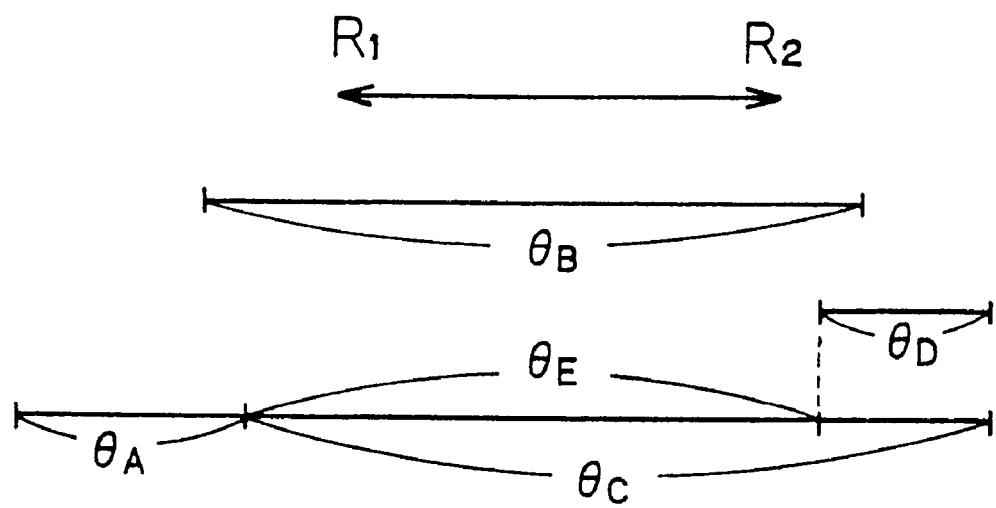
FIG. 20 is a diagrammatical view showing relationships between respective torsion angles of the clutch disk assembly.

Various circumferential angles $\theta_A$, $\theta_B$, $\theta_C$, $\theta_D$, and $\theta_E$ are shown in FIGS. 6 and 7. FIG. 20 is a diagram showing relationships between these circumferential angles $\theta_A$, $\theta_B$, $\theta_C$, $\theta_D$, and $\theta_E$. It should be understood that angle $\theta_A$ corresponds to the circumferential distance between the surfaces 50a and 50b on a single projection 49 (see FIGS. 3 and 7); the angle $\theta_B$ corresponds to the circumferential distance between the outer edge surfaces 43 of a single window 41; the angle $\theta_C$ corresponds to the circumferential distance between the surfaces 50a and 50b on adjacent projections 49; the angle $\theta_D$ corresponds to the circumferential length of each stop portion 32; and the angles $\theta_{E1}$ and $\theta_{E2}$ correspond to the amount of displacement possible in the R1 and R2 directions, respectively, between the stop portion 32 and respective adjacent surfaces 50a and 50b.

Relationship Between $\theta_A$ and $\theta_C$

The circumferential angle $\theta_A$ of each projection 49 is smaller than the circumferential angle $\theta_C$ between the neighboring circumferential ends of the circumferentially neighboring projections 49 (i.e., between the circumferentially opposed stopper surfaces 50). As can be seen from FIG. 20, the angles $\theta_A$ and $\theta_C$ establish such a relationship that one increases as the other decreases. The angle $\theta_A$ employed in this embodiment is smaller than the angle $\theta_C$, whereby $\theta_C$ is increased above a conventional value. By increasing the circumferential space angle $\theta_C$ between the projections 49, it is possible to increase the torsion angle $\theta_E$ of the separated flange 6 with respect to the plates 21 and 22. In the clutch disk assembly 1 of the embodiment of the invention shown in the figures, each angle $\theta_A$ is 21 degrees, and each angle $\theta_C$ is 69 degrees.

The angle $\theta_C$ of 40 degrees or more can achieve a superior effect which cannot be achieved in the prior art. The angle $\theta_C$ ranging from 50 to 80 degrees can improve the effect, the angle $\theta_C$ ranging from 60 to 80 degrees can further improve effect, and the angle $\theta_C$ ranging from 65 to 75 degrees can achieved an optimal effect.

The angle $\theta_A$ of ½ or less of $\theta_C$ can achieve a sufficient effect. The angle $\theta_A$ of ⅓ or less of $\theta_C$ can further improve the effect. In the figures, a ratio between $\theta_A$ and $\theta_C$ is 1:3.29.

The ratio in a range from 1:2 to 1:6 can achieve a sufficient effect, and the ratio in a range from 1:2.5 to 1:5.5 can further improve effect.

Relationship Between $\theta_C$ and $\theta_D$

The circumferential angle $\theta_D$ of each plate-like coupling portion 31 (stopper portion 32) is much smaller than the foregoing angle $\theta_C$. As can be seen from FIG. 20, a difference obtained by subtracting $\theta_D$ from $\theta_C$ is equal to the maximum allowable torsion angle $\theta_E$ (stopper angles $\theta_{E1}$ or $\theta_{E2}$ of the damper mechanism) between the separated flange 6 and the plates 21 and 22. Thus, the damper mechanism has the maximum allowable torsion angle $\theta_E$ (either of $\theta_{E1}$ or $\theta_{E2}$) larger than that in the prior art. It can be seen from FIG. 20 that it is necessary to increase $\theta_C$ and decrease $\theta_D$ for increasing $\theta_E$ (angles $\theta_{E1}$ or $\theta_{E2}$). In this embodiment, $\theta_D$ is 16 degrees. The angle $\theta_D$ is preferably 20 degrees or less, and more preferable is in a range from 10 to 20 degrees.

Relationship Between $\theta_A$ and $_0B$

The circumferential angle $\theta_A$ of each projection 49 is smaller than the circumferential angle $\theta_B$ of each window 41. The fact that a ratio of $\theta_A$ to $\theta_B$ is larger than in the prior art means that a ratio of $\theta_C$ to $\theta_B$ is not necessarily smaller than in the prior art. In other words, the ratio of $\theta_C$ to $\theta_B$ can be sufficiently increased to satisfy a precondition that the maximum allowable torsion angle $\theta_E$ can be large while employing the windows 41 having a maximum torsion angle. The circumferential angle $\theta_A$ of each projection 49 which is ⅔ or less of $\theta_B$ can achieve a sufficient effect. The angle $\theta_A$ of ½ or less of $\theta_B$ is more preferable, and the angle $\theta_A$ of ⅓ or less is even more preferable. In the figures, a ratio between $\theta_A$ and $\theta_B$ is 1:2.90. A ratio between $\theta_A$ and $\theta_B$ is preferably in a range from 1:2 to 1:4, more preferably from 1:2.5 to 1:4.0 and further preferably from 1:2.75 to 1:3.75. The angle $\theta_C$ is larger than the angle $\theta_B$.

Relationship Between $\theta_B$ and $\theta_E$

Both the angles $\theta_E$ and $\theta_B$ are larger than those in the prior art, and thus both the maximum allowable torsion angles of the damper mechanism and the torsion angle of the second spring 8 are comparatively large. Increase in size of the second springs 8 facilitates improved design thereof, and improves their performance (large torsion angle and low rigidity).

From a comparison of $\theta_B$ and $\theta_E$, it can be seen that $\theta_B$ is larger than $\theta_E$, but the difference between them is relatively small. Thus, a ratio of $\theta_E$ to $\theta_B$ is sufficiently small. As a result, it is possible to provide the maximum torsion angle θE which can sufficiently utilize the large torsion angle allowed by the windows 41 and therefore the second springs 8. A ratio of $\theta_B$ to $\theta_E$ is 1:1.13. If this ratio is in a range from 1:1.0 to 1:1.3, a sufficient effect can be achieved, and the range from 1:1.1 to 1:1.2 can further improve the effect.

Radial Length of Window 41

In this damper mechanism, the window 41 has a radial length sufficiently larger than the radial length of the separated flange 6. This allows increase in size of the second springs 8 accommodated in the windows 41, respectively. The radial length of the window 41 is 35% or more of the radius of the separated flange 6. If the ratio is in a range from 35% to 55%, an intended effect can be sufficiently achieved, and the range from 40 to 50% can further achieve the effect.

Figure 8:
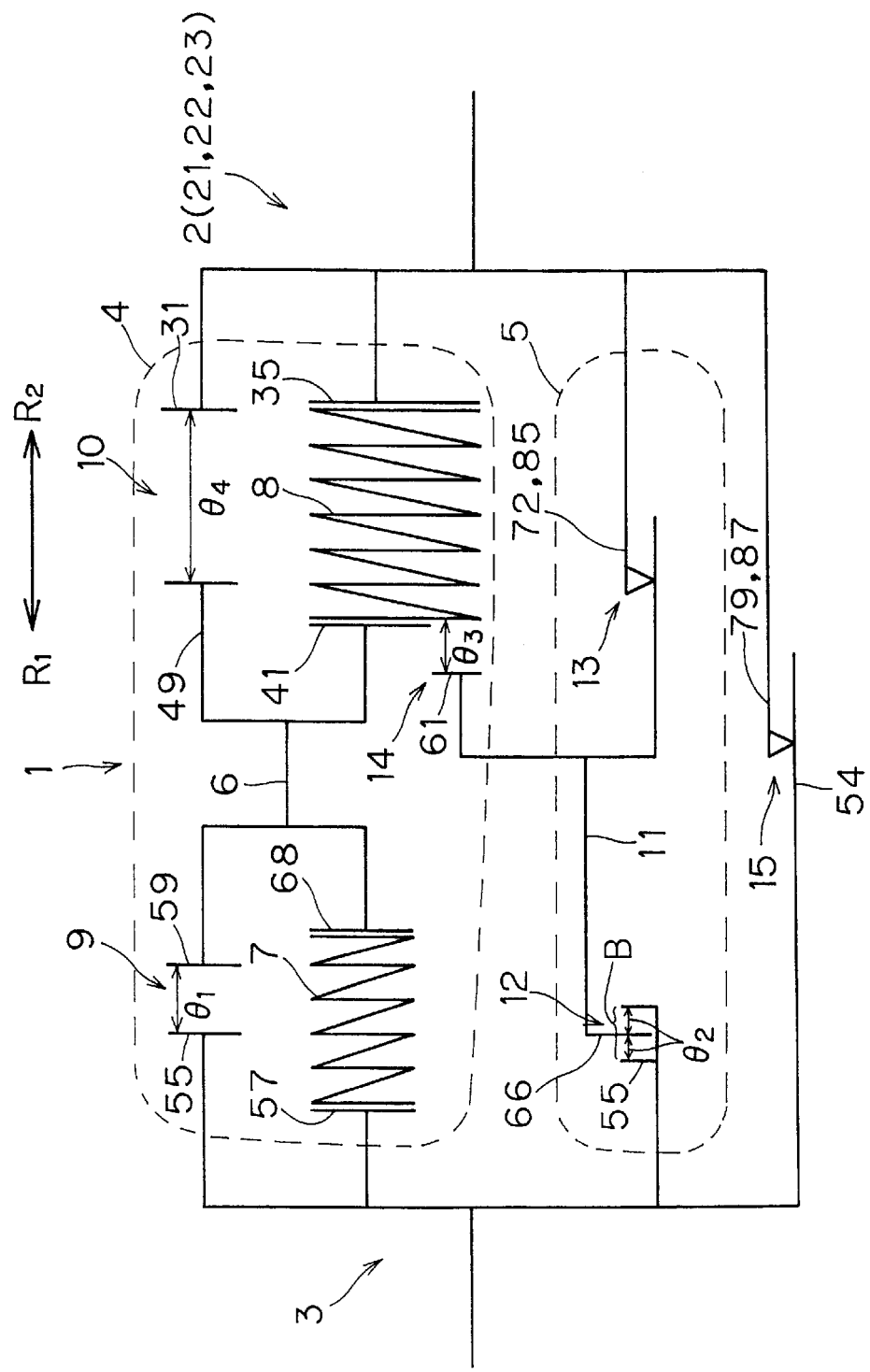
FIG. 8 is a mechanical circuit diagrammatical view schematically showing the function and movements of portions of damper mechanisms of the clutch disk assembly depicted in FIGS. 1–7.

The structure of the clutch disk assembly 1 is described below more in detail with reference to FIG. 8. FIG. 8 is a mechanical circuit diagram of the damper mechanism of the clutch disk assembly 1. This mechanical circuit diagram schematically shows the damper mechanism, and represents operations and relationships of respective members which are performed and established when the output rotary member 3 rotates in one direction (e.g., toward R2 side) with respect to the input rotary member 2. As can be seen in FIG. 8, a plurality of members forming the damper mechanism are arranged between the input and output rotary members 2 and 3. The separated flange 6 is arranged between the input and output rotary members 2 and 3. The separated flange 6 is circumferentially and elastically coupled to the output rotary member 3 through the first springs 7. The first stop 9 is formed between the separated flange 6 and the output rotary member 3. The first springs 7 can be compressed within a torsion angle range corresponding to first torsion angle θ1 in the first stop 9. The separated flange 6 is circumferentially and elastically coupled to the input rotary member 2 through the second springs 8. The second stop 10 is formed between the separated flange 6 and the input rotary member 2. The second springs 8 can be compressed within a torsion angle displacement range corresponding to a fourth torsion angle $\theta_4$ in the second stop 10. As described above, the input and output rotary members 2 and 3 are elastically coupled together in the rotating direction through the first and second springs 7 and 8 arranged in series. In this structure, the separated flange 6 functions as an intermediate member arranged between the two kinds of springs. The structure described above can be considered as a damper formed of the first springs 7 and the first stop 9 arranged in parallel is arranged in series with the damper formed of the second springs 8 and the second stop 10 arranged in parallel. The structure described above can also be deemed as the first damper mechanism 4 which elastically couples the input and output rotary members 2 and 3 together in the rotating direction. The rigidity of the first springs 7 is significantly smaller than the rigidity of the second springs 8. Therefore, the second springs 8 are hardly compressed in the rotating direction within a range smaller than the first torsion angle $\theta_1$.

The intermediate plates 11 are operably arranged between the input and output rotary members 2 and 3. The intermediate plate 11 has a portion engagable with the second springs 8. The intermediate plate 11 includes the inner teeth 66 which together with the outer teeth 55 define the third stop 12 which are separated by a space corresponding in circumferential length to the second torsion angle $\theta_2$. The third stop 12 provides the space for allowing relative rotation between the output rotary member 3 and the intermediate plate 11 when minute torsional vibrations are supplied to the mechanism in the first stage, as is described below. The intermediate plate 11 is frictionally engaged in the rotating direction with the input rotary member 2 through the friction generating mechanism 13. Further, the intermediate plate 11 includes the engagement portions 61, which are spaced from the circumferentially opposite ends of the second springs 2 by circumferential spaces corresponding to the third torsion angle $\theta_3$, respectively. In the intermediate plate 11 described above, the third stop 12 and the friction generating mechanism 13 are arranged in series with each other, and this arrangement achieves the second damper mechanism 5 coupling the input and output rotary members 2 and 3 in the rotating direction. The second damper mechanism 5 is arranged to operate in parallel with the first damper mechanism 4.

Description is now be given on relationships between the angles $\theta_1$–$\theta_4$ of the damper mechanisms shown in FIG. 8. The angles described below are determined between the output rotary member 3 and the input rotary member 2 on the negative side of the output rotary member 3 (i.e., the input rotary member 2 and the output rotary member 3 on the positive side). The first torsion angle $\theta_1$ is the maximum positive torsion angle in the first stage allowed in the damper mechanism provided with the first springs 7. The fourth torsion angle $\theta_4$ in the second stop 10 is equal to a maximum positive torsion angle $\theta_E$ allowed in the damper mechanism provided with the second springs 8, and corresponds to the second stage of relative rotary displacement between the input and output rotary members 2 and 3. A total of the first and fourth torsion angles $\theta_1$ and $\theta_4$ is equal to the maximum positive torsion angle allowed in the whole damper mechanism of the clutch disk assembly 1. The second torsion angle $\theta_2$ must be equal to or smaller than the first torsion angle $\theta_1$. For example, the first torsion angle $\theta_1$ is 5 degrees and the second torsion angle is 2 degrees in this embodiment. A difference between the first and second torsion angles $\theta_1$ and $\theta_2$ must be smaller than the third torsion angle $\theta_3$. A value obtained by subtracting the third torsion angle $\theta_3$ from the difference between the first and second torsion angles $\theta_1$ and $\theta_2$ is equal to a space angle $\theta_A$ for preventing operation of the friction generating mechanism 13 when minute torsional vibrations are supplied in the second stage of the torsion characteristics. The space angle $\theta_A$ in this embodiment is 1 degree, and is preferably in a range from 1 to 2 degrees. A total of the positive and negative second torsion angles $\theta_2$ is a total space angle $\theta_B$ for preventing operation of the friction generating mechanism 13 when minute torsional vibrations are supplied in the first stage of the torsion characteristics. In this embodiment, the positive and negative second torsion angles $\theta_2$ are both equal to 2 degrees, and the total space angle $\theta_B$ is equal to 4 degrees. The total space angle $\theta_B$ is preferably larger than the space angle $\theta_A$, and is more preferably equal to double the space angle $\theta_A$ or more. The total space angle $\theta_B$ in a range from 3 to 5 degrees can achieve a good effect.

As shown in FIG. 8, the friction generating mechanism 15 is arranged between the input and output rotary members 2 and 3. The friction generating mechanism 15 is adapted to generate friction whenever relative rotation occurs between the input and output rotary members 2 and 3. In this embodiment, the friction generating mechanism 15 is basically formed of the first and second friction washers 79 and 87, but may be formed of members other than the above. In some cases, it is desirable that the hysteresis torque generated in the friction generating mechanism 15 is as small as possible.

Characteristics of the damper mechanism in the clutch disk assembly 1 are described below with reference to mechanical circuit diagrams of FIGS. 8 to 18 and a torsion characteristic diagram of FIG. 19. This torsion characteristic diagram shows a relationship between the torsion angle and the torque in the operation of twisting the input and output rotary members 2 and 3 relatively to each other between the maximum allowable positive and negative torsion angles.

Figure 12:
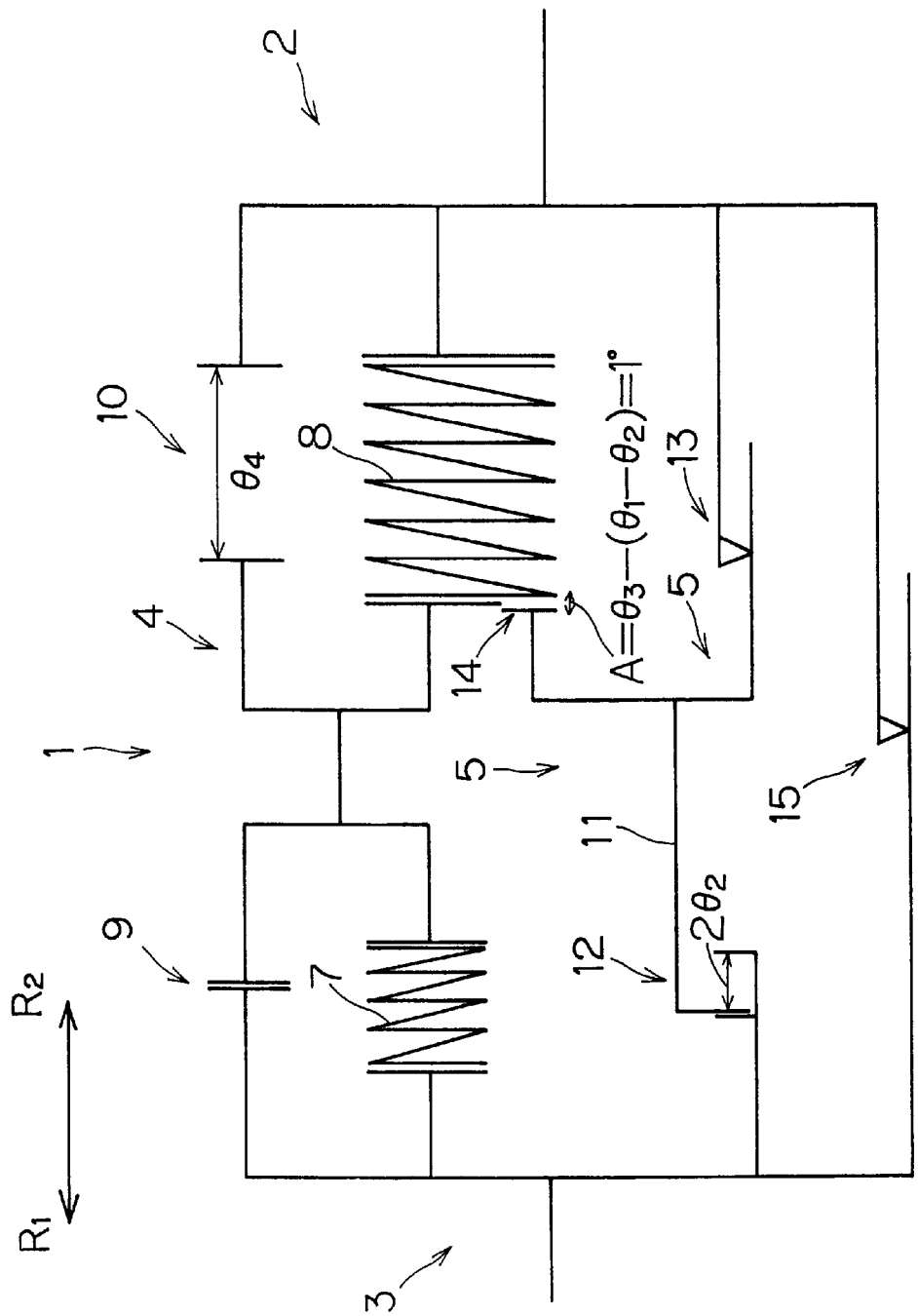
Figure 13:
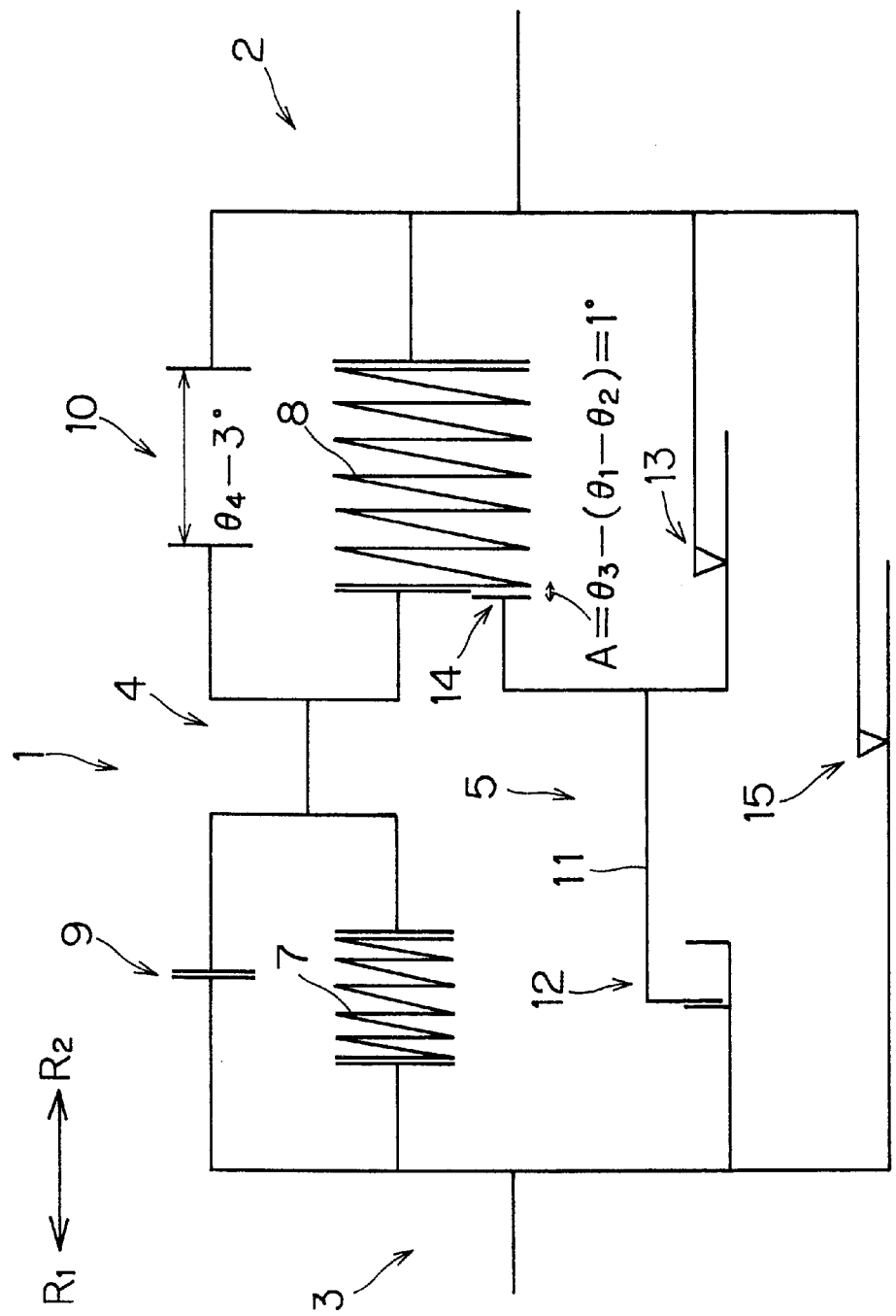
Figure 14:
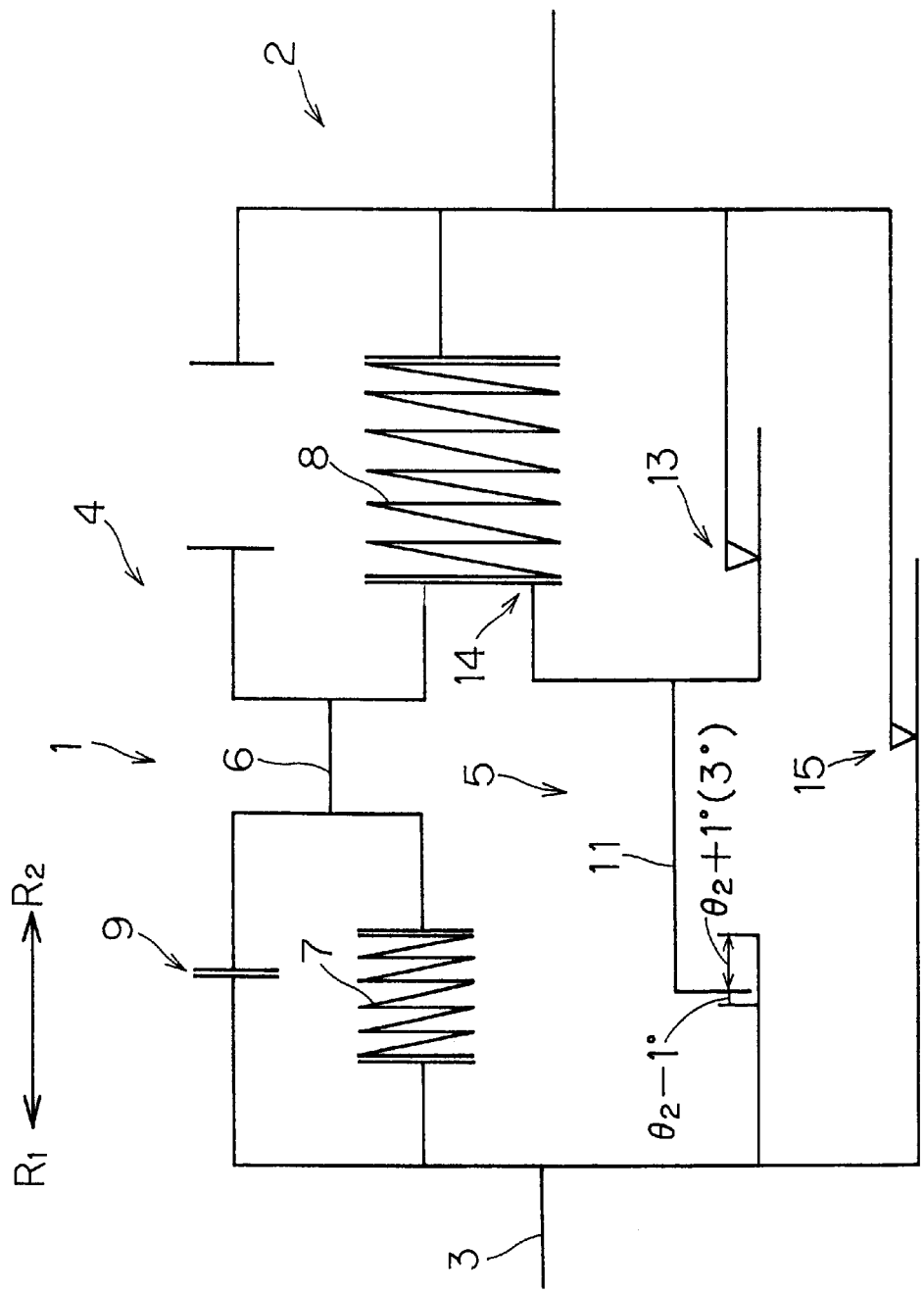
Figure 15:
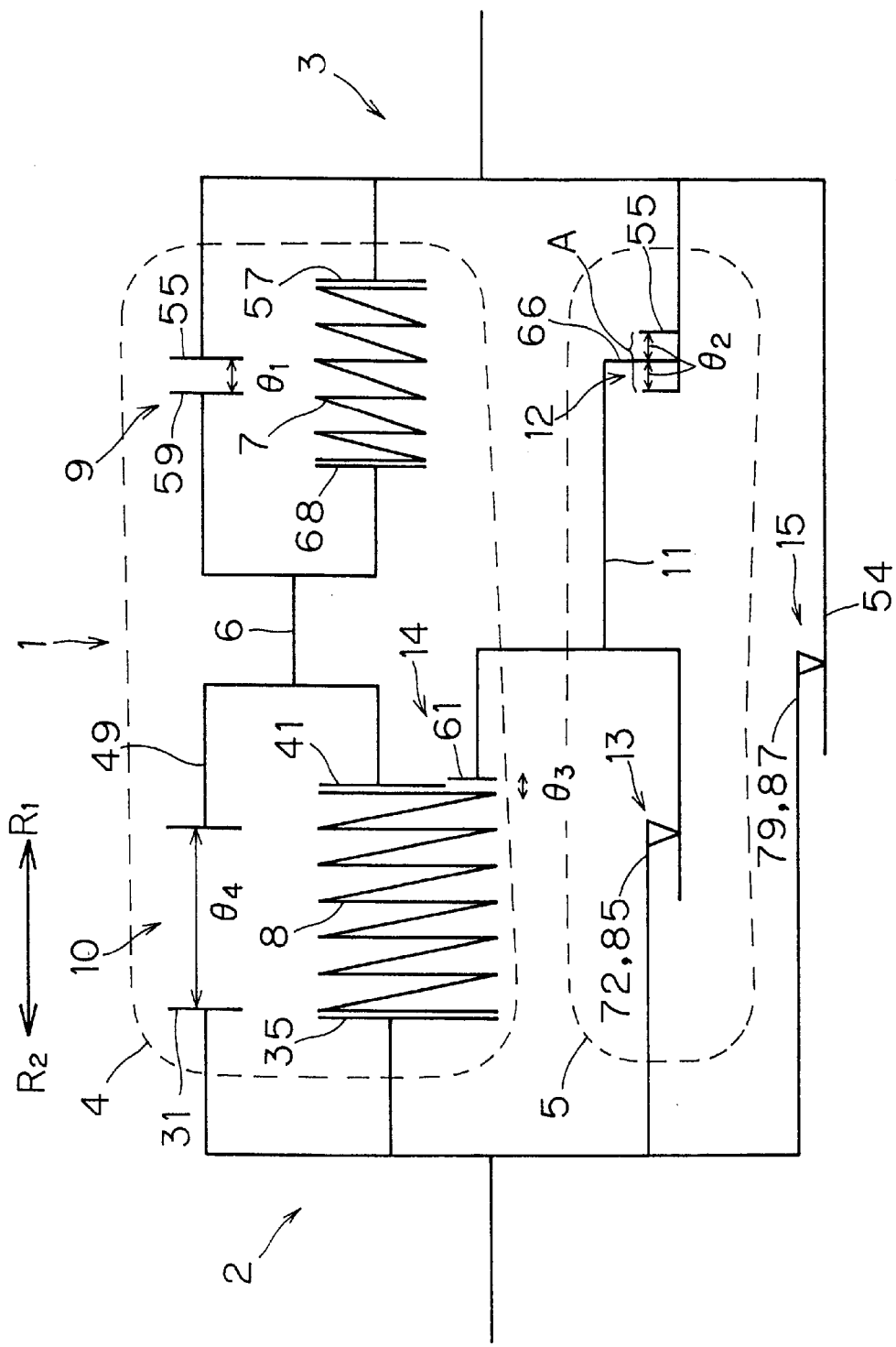
Figure 16:
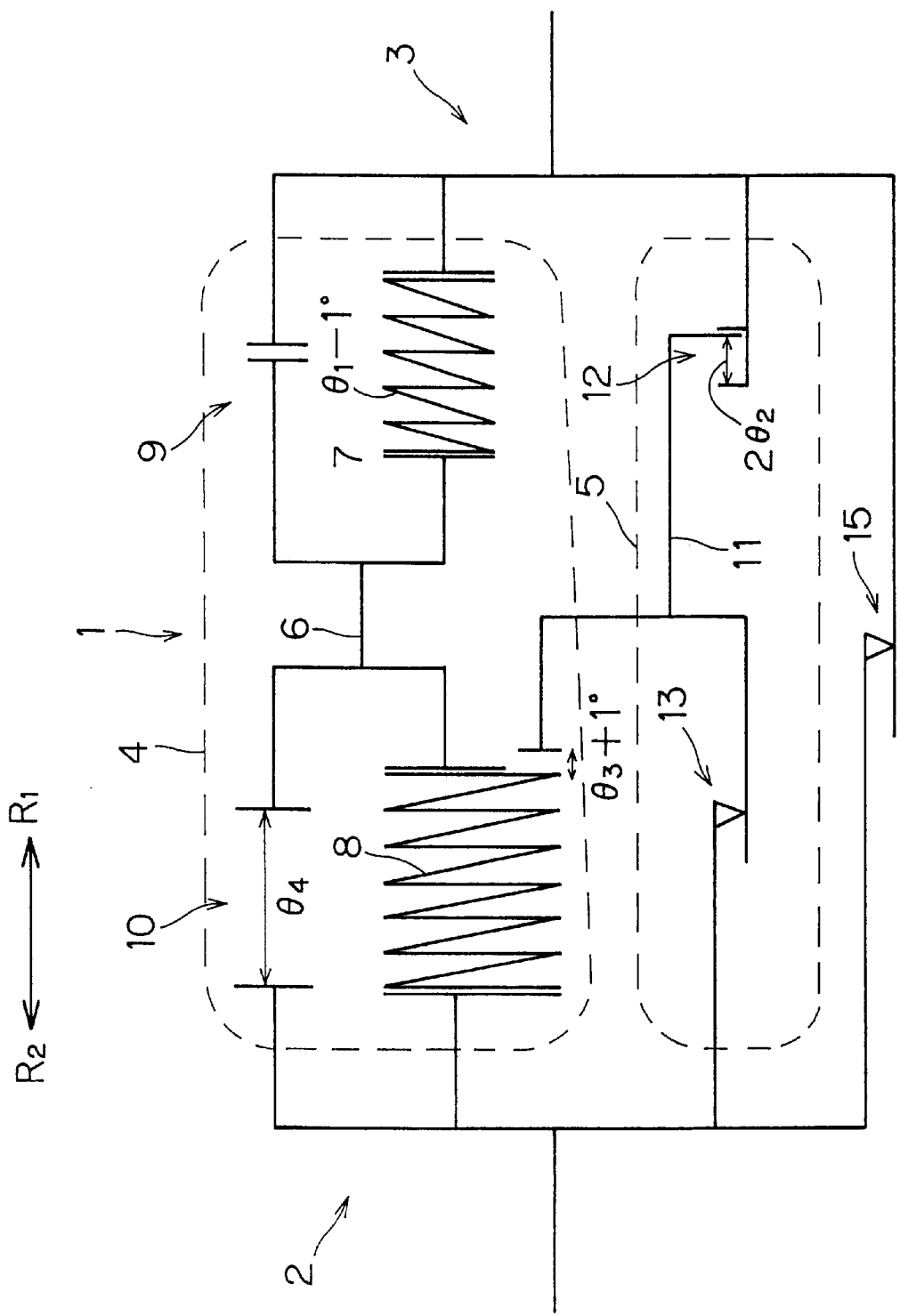
Figure 17:
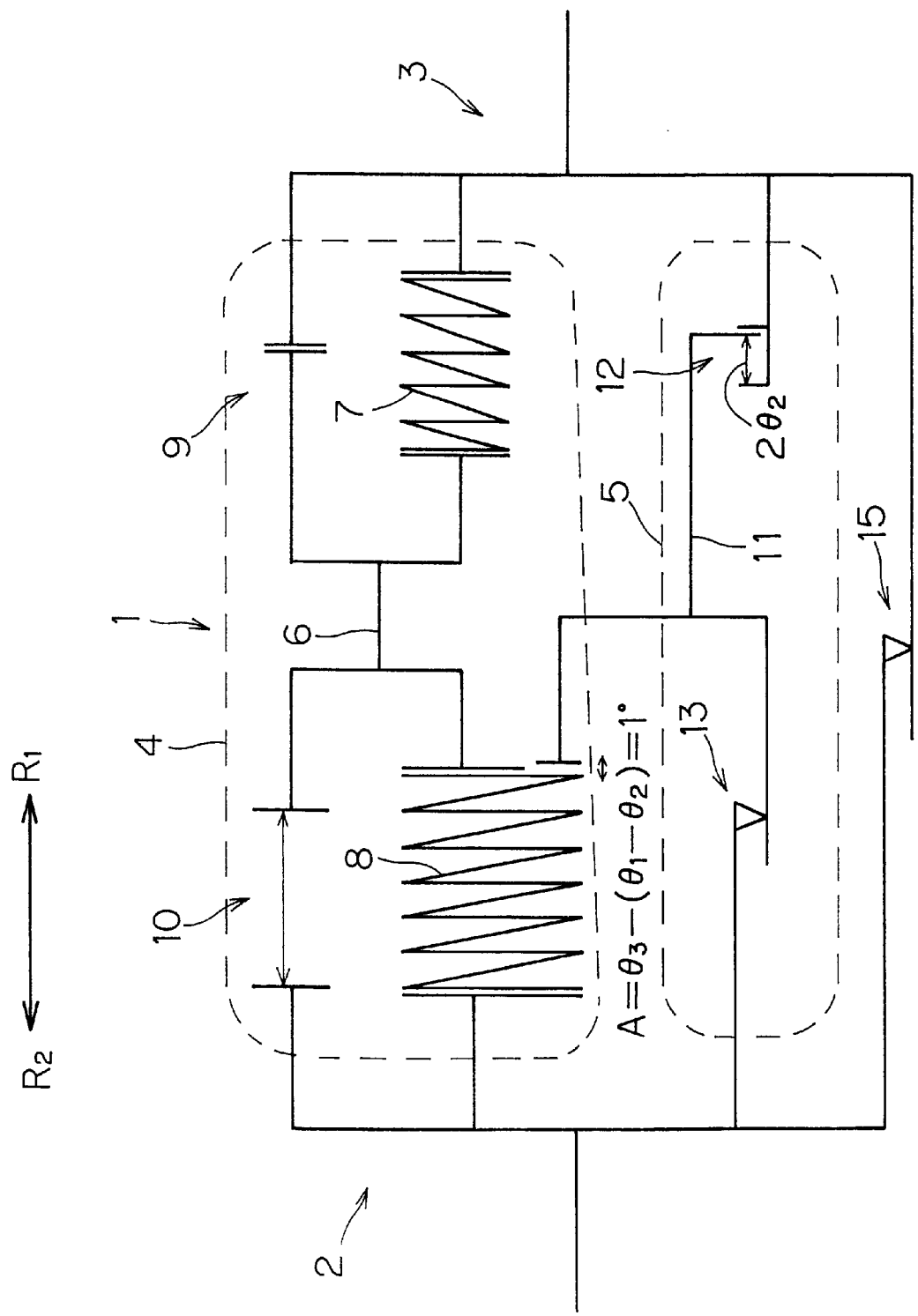
Figure 18:
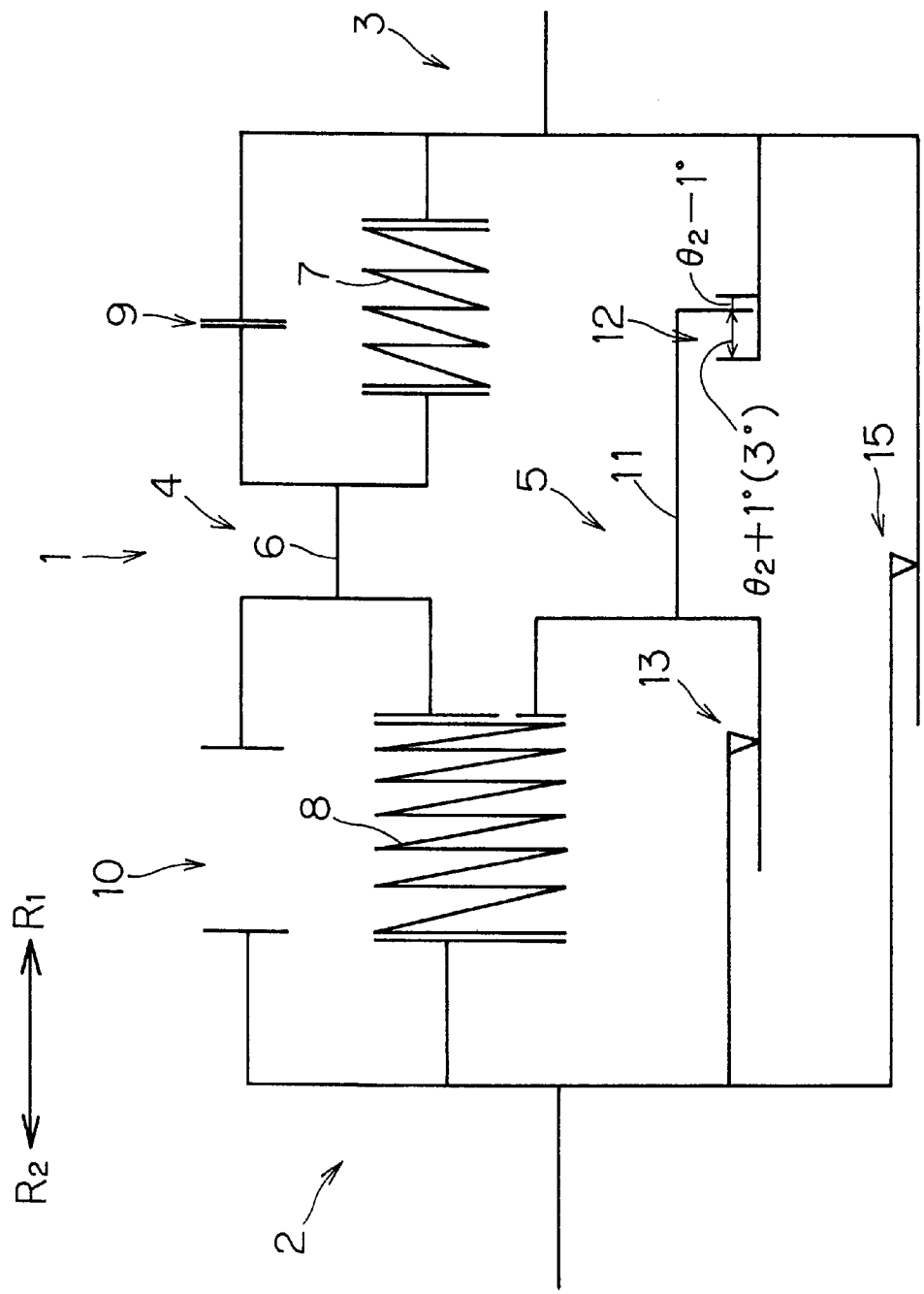

FIGS. 8 and 15 show states where the input and output rotary members 2 and 3 are in a torsion free state (with a torsion angle corresponding to total relative rotary displacement of zero degrees). The states depicted in FIGS. 8 and 15 are not indicated in the torsional characteristic diagram in FIG. 19. FIGS. 9 to 14 show states where the output rotary member 3 is rotated from the zero-degree position toward the R2 side with respect to the input rotary member 2 such that a torsion angle other that zero is measurable (for instance, the input rotary member 2 is rotated from the zero-degree position toward the R1 side or positive side with respect to the output rotary member 3). FIGS. 9 to 13 show states where positive changes occur in the positive region, and FIG. 14 shows a state where a negative change occurs in the positive region. FIGS. 16 to 18 show states where the output rotary member 3 is rotated from the zero-degree position toward the R1 side (positive side) with respect to the input rotary member 2 (i.e., the input rotary member 2 is rotated from the zero-degree position toward the R2 side, i.e., negative side with respect to the output rotary member 3). FIGS. 16 and 17 show states where negative changes occur in the negative region, and FIG. 18 shows a state where a positive change occurs in the negative region.

Figure 9:
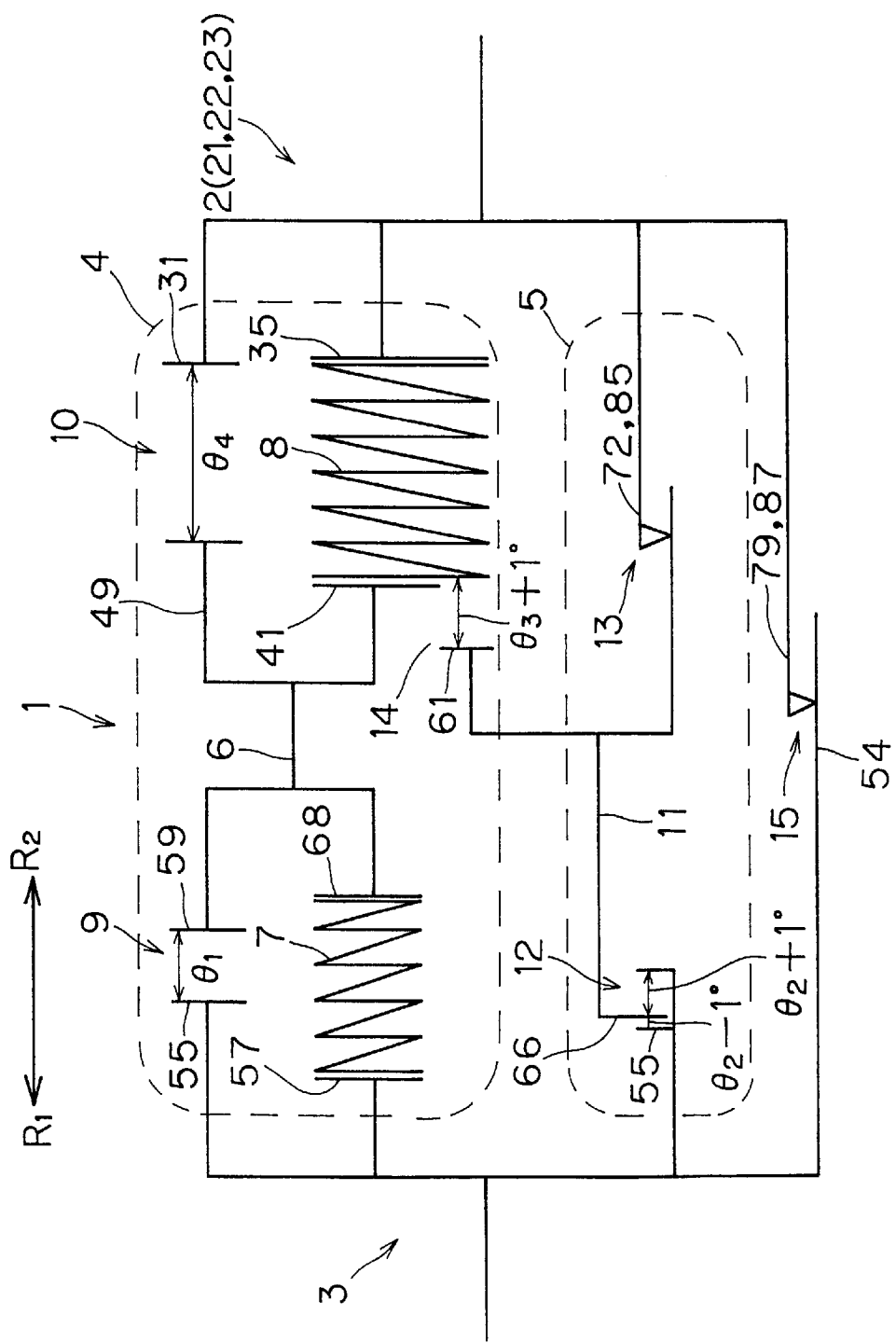
FIGS. 9–18 are further mechanical circuit diagrammatical views schematically showing the function and movements of portions of damper mechanisms of the clutch disk assembly depicted in FIGS. 1–7.
Figure 10:
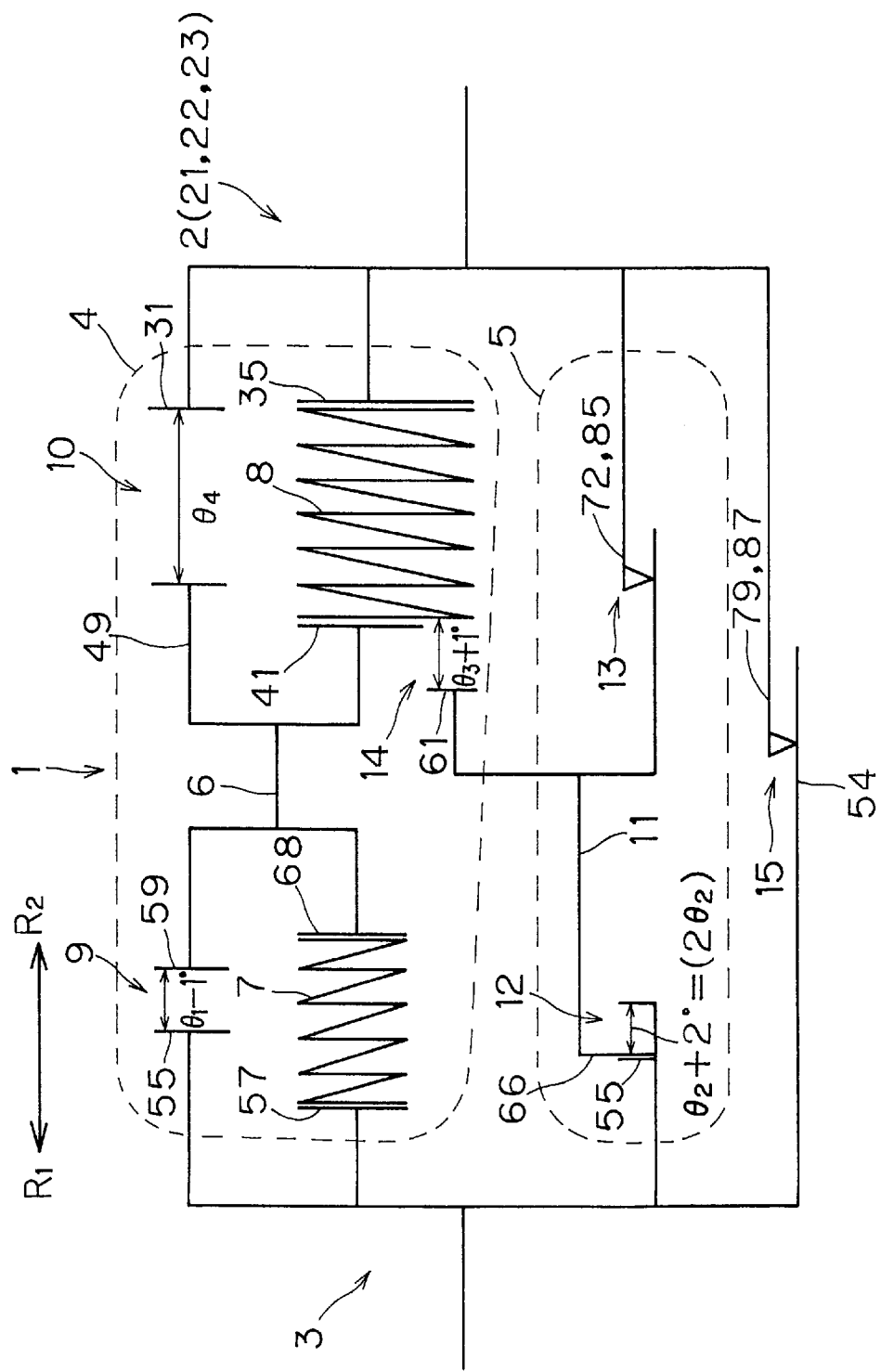
Figure 11:
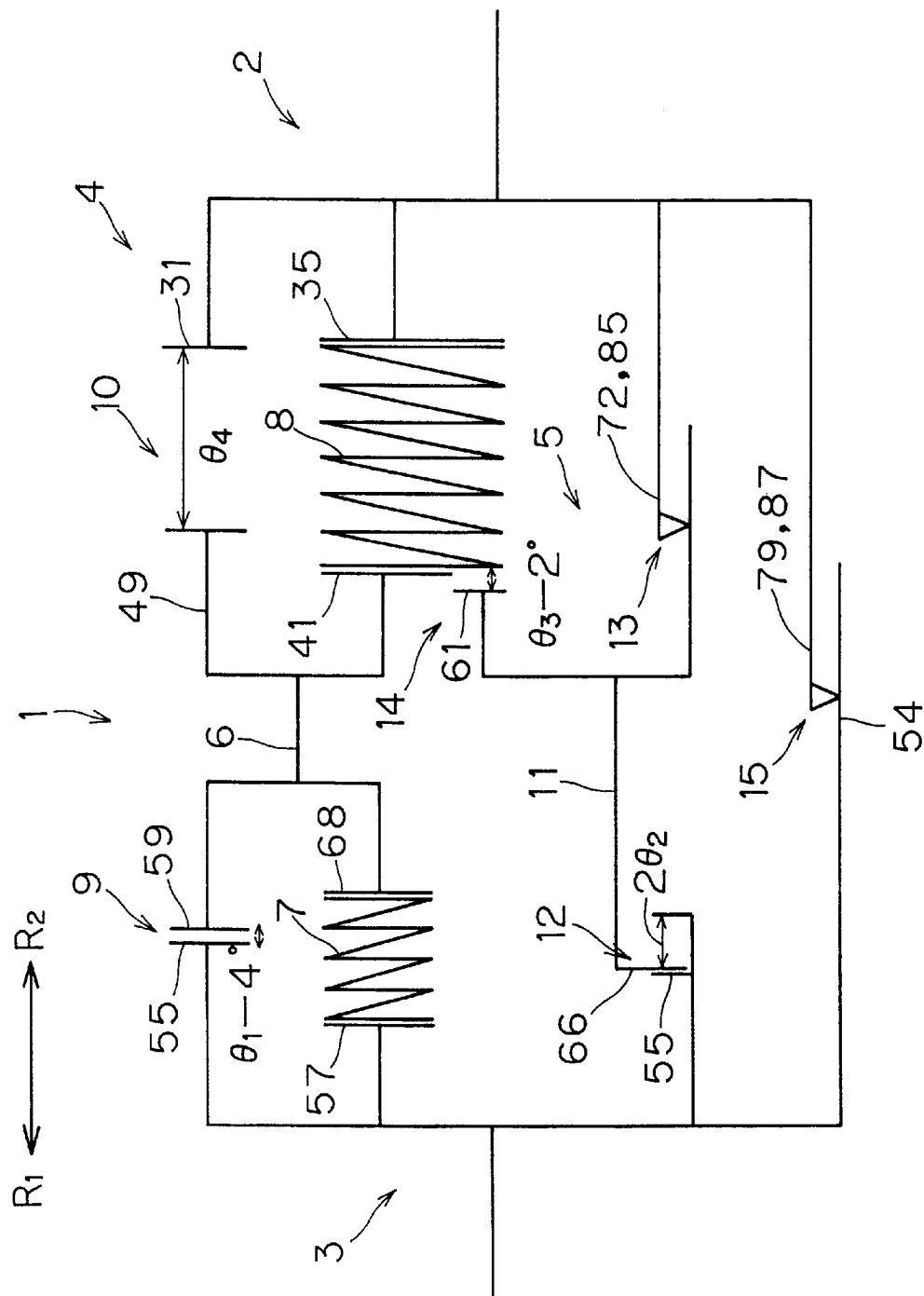

FIG. 9 shows the relationship at the time when twist occurs from the negative side to the positive side at 0 degree in the torsion characteristics. In this state, the intermediate plate 11 is shifted by 1 degree toward the output rotary plate 3 (R1 side) from the position in the still state shown in FIG. 8. Therefore, a space of a sum (5 degrees) of the third torsion angle $\theta_3$ and $\theta_1$ degree is formed between each engagement portion 61 of the intermediate plate 11 and the second spring 8. When the torsion angle goes to 1 degree, the output rotary member 3 is shifted by 1 degree with respect to the input rotary member 2 from the position shown in FIG. 9, and the output teeth 55 of the output rotary member 3 come into contact with the inner teeth 66 of the intermediate plate 11, as shown in FIG. 10. Thereafter, each first spring 7 is compressed between the output rotary member 3 and the separated flange 6 as shown in FIG. 11 while the torsion angle is between 1 and 5 degrees. Thereby, slide occurs in the friction generating mechanism 13. As a result, characteristics of a low rigidity and a high hysteresis torque are produced in the first stage from 1 to 5 degrees. When the torsion angle goes to the first torsion angle $\theta_1$ (5 degrees) as shown in FIG. 12, the outer teeth 55 of the output rotary member 3 come into contact with the inner teeth 59 of the separated flange 6 thus reaching the limit of the first stage of relative rotary displacement. As a result, each second spring 8 begins to be compressed between the separated flange 6 and the input rotary member 2 in the second stage from 5 degrees to the positive maximum allowable torsion angle $\theta_4$ (E1), as shown in FIG. 13 (8 degrees). As a result, characteristics of a high rigidity and a high hysteresis torque are produced. In the state shown in FIG. 13, a space angle $\theta_B$ (1 degree) is kept between each engagement portion 61 of the intermediate plate 11 and the end of the second spring 8. This space angle $\theta_B$ is equal to a value obtained by subtracting the third torsion angle $\theta_3$ (4 degrees) from a difference between the first torsion angle $\theta_1$ (5 degrees) in the still state shown in FIG. 8 and the second torsion angle $\theta_2$ (2 degrees).

When the torsion angle returns toward the negative side after reaching the maximum value, the second spring 8 in the compressed state shown in FIG. 13 expands and pushes the separated flange 6 so that the end of the second spring 8 comes into contact with the engagement portion 61 of the intermediate plate 11 as shown in FIG. 14. No sliding occurs in the friction generating mechanism 13 in the range of 1 degree before the end of the second spring 8 comes into contact with the engagement portion 61.

The second spring 8 pushes the separated flange 6 as well as the intermediate plate 11. Therefore, the intermediate plate 11 keeps the position shifted by 1 degree toward the R1 side from the output rotary member 3.

When the torsion angle reaches 5 degrees, the second spring 8 attains the torsion free state, and then each first spring 7 starts to expand. At this time, the intermediate plate 11 is shifted by 1 degree toward the R1 side with respect to the output rotary member 3, as shown in FIG. 14, so that characteristics of a low rigidity and a low hysteresis torque are obtained in a range from start of expansion of the first spring 7 to arrival of the output rotary member 3 at the position shifted by (2+1 deg.=3 deg.) with respect to the intermediate plate 11. Thus, no sliding occurs in the friction generating mechanism 13 in a range from 5 degrees to 2 degrees. When the torsion angle reaches 2 degrees, the output rotary member 3 starts to move the intermediate plate 11 toward the R1 side so that the intermediate plate 11 is spaced from the end of the second spring 8 as shown in FIG. 16, and sliding occurs in the friction generating mechanism 13. As a result, characteristics of a low rigidity and a high hysteresis torque are produced in the first stage from 2 degrees to −2 degrees. When the torsion angle enters a range lower than 0 degrees, the first spring 7 is compressed between the output rotary member 3 and the separated flange 6 as shown in FIG. 16. When the torsion angle exceeds −2 degrees, the second stop 9 comes into contact and the second spring 8 is compressed between the separated flange 6 and the input rotary member 2. The opposite side of the first stop 9 comes into contact, and thereafter the second spring 8 is compressed between the intermediate plate 11 and the input rotary member 2. As a result, characteristics of a high rigidity and a high hysteresis torque are produced in the negative second stage. When the state returns from the negatively twisted state in the second stage toward the positively twisted state, the second spring 8 pushes the separated flange 6 and the intermediate plate 11 as shown in FIG. 18. In this operation, the friction generating mechanism 13 causes sliding and thereby generates a high hysteresis torque. In this return state, the intermediate plate 11 is in the position shifted by 1 degree toward the R1 side with respect to the output rotary member 3. When the torsion angle reaches −2 degrees, the second spring 8 stops expanding, and the first spring 7 starts expanding. In a range of 3 degrees (i.e., 2+1 deg.) from −2 degrees to 1 degree, the first spring 7 urges the output rotary member 3, but the intermediate plate 11 does not slide with respect to the input rotary member 2 so that a high hysteresis torque is not produced.

Description is specifically given on changes in torsion characteristic which occur when vibrations are supplied to the clutch disk assembly 1.

Figure 19:
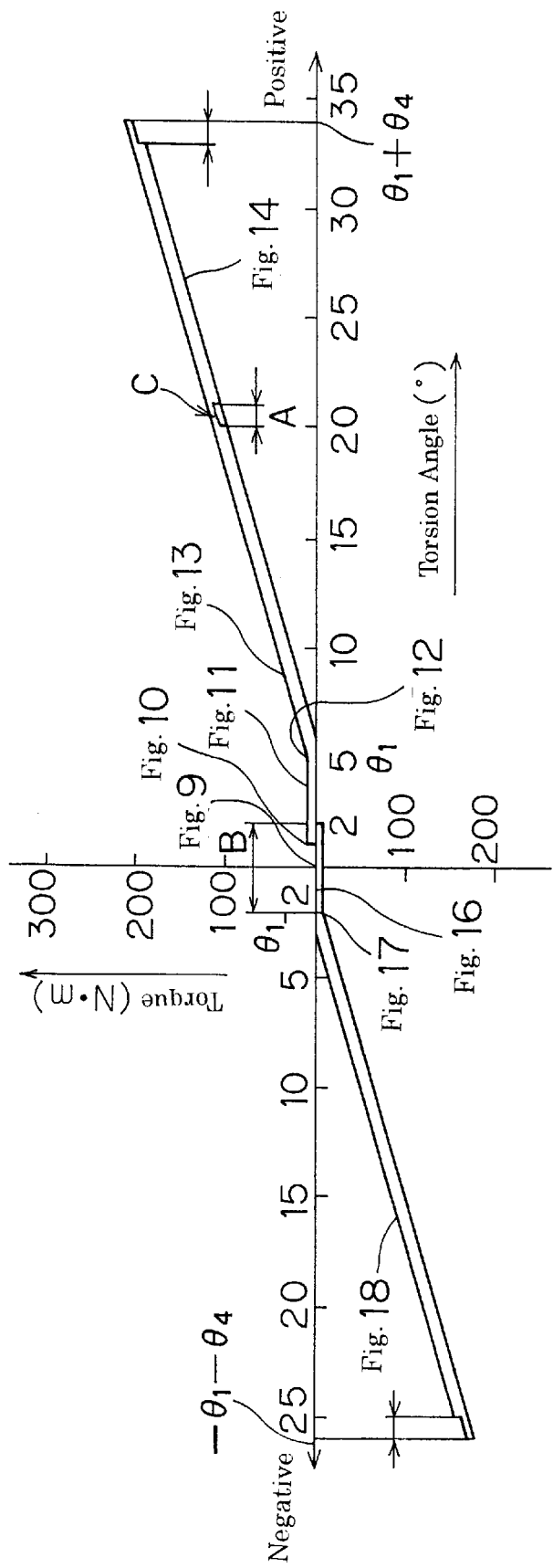
FIG. 19 is a diagrammatical view showing torsion response characteristics of the clutch disk assembly with labels indicating the corresponding state of the damper mechanisms, assembly as shown in FIGS. 8–18.

When torsional vibrations of a large amplitude such as longitudinal vibrations of a vehicle occur, the torsion angle repetitively changes in and between the positive and negative second stages of the characteristics shown in FIG. 19. In this operation, a high hysteresis torque occurs in both the first and second stages so that longitudinal vibrations of the vehicle are rapidly damped.

It is assumed that the clutch disk assembly 1 is supplied with minute torsional vibrations caused, e.g., by combustion variations in the engine during normal driving (e.g., in the positive second stage shown in FIG. 13). In this state, the output and input rotary members 3 and 2 can rotate relatively to each other through a range of the space angle $\theta_A$ of 1 degree equal to ($\theta_3 - (\theta_1 - \theta_2)$) without operating the friction generating mechanism 13. Thus, in the range of the space angle $\theta_A$ shown at Point C in FIG. 19, the second spring 8 operates, but sliding does not occur in the friction generating mechanism 13. As a result, minute torsional vibrations, which may cause rattle and muffled noises during driving, can be effectively absorbed.

Description is now be given on the operation in the case where minute vibrations such as idling vibrations are supplied to the clutch disk assembly 1. In this case, the damper mechanism operates in the positive and negative first ranges (from −2 to 5 degrees, e.g., FIGS. 9, 10 and 11). When minute torsional vibrations are supplied, e.g., in the state shown in FIG. 9, the output rotary member 3 rotates relatively to the separated flange 6, intermediate plate 11 and input rotary member 2. In this operation, the first springs 7 operate, and no sliding occurs in the friction generating mechanism 13. The magnitude of the torsion angle of the damper mechanism in this operation is not larger than the total space angle $\theta_B$ (4 degrees) in the third stop 12.

The low rigidity and low hysteresis torque achieved in the first stage improve the standing gear noise level. Although the low rigidity and low hysteresis torque achieved to a higher extent in the first range may cause a jumping phenomenon, the jumping phenomenon is suppressed in the clutch disk assembly 1 by provision of the regions of a high hysteresis torque in the opposite sides of the first stage. The above jumping phenomenon is a phenomenon, in which vibrations rebound from walls of both the positive and negative second stages and develop into vibrations over the entire first range so that noises at a higher level than a standing gear noise level occur.

As described above, the friction generating mechanism 13 frictionally engages the input and output rotary members 2 and 3 with each other in the rotating direction, and can cause sliding in the first and second stages. The space of the second torsion angle $\theta_2$ in the third stop 12 and the space of the third torsion angle $\theta_3$ in the fourth stop 14 function as friction suppressing means for preventing sliding in the friction generating mechanism 13 which may be caused by torsional vibrations of a predetermined torque or less in the first and second stages. Further, the whole second damper mechanism 5 can be considered as a friction generating mechanism, which does not cause internal sliding when supplied with torsional vibrations not larger than the predetermined torque in the first and second ranges, but causes internal sliding to produce friction when supplied with torsional vibrations larger than the predetermined torque. The third stop 12 can be considered as a first friction suppressing mechanism which suppresses sliding in the friction generating mechanism 13 when supplied with torsional vibrations not larger than the predetermined torque in the first stage. The fourth stop 14 can be considered as a second friction suppressing mechanism which suppresses sliding in the friction generating mechanism 13 when supplied with torsional vibration not larger than the predetermined torque in the second stage.

In the clutch disk assembly 1, the second stage of the torsion angle is increased by employing the plate-like coupling portions 31 instead of conventional stop pins, whereby the resonance point of the engine rotation speed shifts toward the lower side. Further, the high hysteresis torque can reduce a peak of the resonance point.

Moreover, the rattle and muffled noises during driving can be reduced by employing the structure, which does not produce a high hysteresis torque in response to minute torsional vibrations, in addition to the structure achieving the low rigidity in the second stage of the torsion angle.

According to the damper mechanism of the present invention, a high hysteresis torque is produced even in the first stage when the mechanism is supplied with torsional vibrations causing torsion over the first and second stages, and a high hysteresis torque is not produced in both the first and second stages when supplied with minute torsional vibrations.

What is claimed is:

1. A damper mechanism comprising:
   a first rotary member;
   a second rotary member coupled to said first rotary member for relative rotary displacement with respect to said first rotary member about a central rotary axis, the relative rotary displacement occurring in a rotating direction defined about the central rotary axis;
   a first elastic member elastically coupling said first and second rotary members together in the rotating direction, said first elastic member being compressible in a first stage of the relative rotary displacement between said first and second rotary members, said first stage being confined within a first torsion angle;
   a second elastic member elastically coupling said first and second rotary members together in the rotating direction, and being compressible in a second stage of the relative rotary displacement between said first and second rotary members, said second stage being defined by a second torsion angle that exceeds said first torsion angle in circumferential size, said second elastic member providing rigidity in said second stage that is greater than rigidity of said first elastic member in said first stage;
   a first friction generating mechanism frictionally coupling said first and second rotary members to each other in the rotating direction, said first friction generating mechanism being configured to allow sliding between said first and second rotary members within both of said first and second stages;
   a friction suppressing mechanism located between said first and second rotary members to prevent sliding of said friction generating mechanism in response to torsional vibrations having a magnitude less than a predetermined torque in said first and second stages, said friction suppressing mechanism being arranged to define defining a first rotational gap to render said friction generating mechanism inoperable in response to said torsional vibrations in said first stage and a second rotational gap to render said friction generating mechanism inoperable in response to said torsional vibrations in said second stage.

2. The damper mechanism as set forth in claim 1, further comprising a separate plate operably disposed between said first and second rotary members, said first elastic member being disposed between said first rotary member and said separated plate and said second elastic member being disposed between said separated plate and said second rotary member.

3. A damper mechanism comprising:
   a first rotary member;
   a second rotary member coupled to said first rotary member for relative rotary displacement with respect to said first rotary member about a central rotary axis, the relative rotary displacement occurring in a rotating direction defined about the central rotary axis;
   a first damper mechanism provided for coupling said first and second rotary members together in the rotating direction and damping torsional vibration therebetween, said first damper mechanism including:
      a first intermediate member operably disposed between said first and second rotary members;
      a first elastic member disposed between said first rotary member and said first intermediate member, said first elastic member being compressible therebetween within a portion of the relative rotary displacement defined by a first circumferential angle; and,
      a second elastic member disposed between said first intermediate member and said second rotary member having a spring constant larger than a spring constant of said first elastic member; and
   a second damper mechanism coupling said first and second rotary members together in the rotating direction, arranged in parallel with said first damper mechanism for damping a torsional vibration, said second damper mechanism including:
      a second intermediate member operably disposed between said first and second rotary members;
      a stop operable within a second portion of the relative rotary displacement defined by a second circumferential angle that is smaller than the first circumferential angle; and
      a friction generating mechanism frictionally engaging said second intermediate member and said second rotary member in the rotating direction, wherein,
   a portion of said second intermediate member is formed with a space with respect to said second elastic member, said space defining a third circumferential angle with said damper mechanism in a torsion free state, said third circumferential angle being larger than a difference between said first and second circumferential angles.

4. A damper mechanism comprising:
   a hub;
   a pair of input plates configured for connection to friction clutch members, said pair of input plates being coupled to said hub for relative rotary displacement with respect thereto about a central rotary axis, the relative rotary displacement occurring in a rotating direction defined about the central rotary axis;
   a first intermediate member disposed at a radially outward side of said hub, said first intermediate member extending between said pair of input plates, said first intermediate member being rotatable with respect to said hub within a first circumferential angle;
   a first elastic member elastically coupling said hub and said pair of input plates to each other in the rotating direction, said hub and said first intermediate member being relatively rotatable with respect to one another within an angular range defined by a first circumferential angle;
   a second elastic member elastically coupling said first intermediate member and said pair of input plates in the rotating direction, and having a spring constant larger than a spring constant of said first elastic member; and
   a second intermediate member disposed between said hub and said pair of input plates, a portion of said second intermediate member being contactable with a portion of said hub in response to rotation therebetween, said portion of said intermediate member being spaced apart from said portion of said hub by a second circumferential angle smaller than the first circumferential angle, said portion of said second intermediate member and said portion of said hub defining a first stop, said second intermediate member further being formed with a second portion engagable with said second elastic member in response to rotation between said second intermediate member and said pair of input plates, said second portion being spaced apart from said second elastic member by a third circumferential angle, said third circumferential angle being larger than a difference between said first and second circumferential angles.

5. The damper mechanism as set forth in claim 4, further comprising a friction generating mechanism frictionally coupling said hub and said pair of input plates to each other in the rotating direction, said friction generating mechanism being configured for generating friction in response to relative rotation between said hub and said pair of input plates.

6. The damper mechanism as set forth in claim 5, wherein said friction generating mechanism includes a first friction washer fixed to one of said pair of input plates, said first friction washer contacting said second intermediate plate for creating friction with respect thereto in response to rotation between said pair of input plates and said second intermediate plate.

7. The damper mechanism as set forth in claim 6, wherein said friction generating mechanism further includes a second friction washer connected to said first friction washer for rotation therewith, said second friction washer contacting said hub for creating friction with respect thereto in response to rotation between said pair of input plates and said hub.

* * * * *